United States Patent
Ohnishi et al.

(10) Patent No.: US 8,947,365 B2
(45) Date of Patent: Feb. 3, 2015

(54) STORAGE MEDIUM STORING IMAGE PROCESSING PROGRAM FOR IMPLEMENTING IMAGE PROCESSING ACCORDING TO INPUT COORDINATE, AND INFORMATION PROCESSING DEVICE

(75) Inventors: Naonori Ohnishi, Kyoto (JP); Taiju Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1033 days.

(21) Appl. No.: 12/255,924

(22) Filed: Oct. 22, 2008

(65) Prior Publication Data

US 2010/0079388 A1 Apr. 1, 2010

(30) Foreign Application Priority Data

Sep. 30, 2008 (JP) .................. 2008-254003

(51) Int. Cl.
 *G06F 3/03* (2006.01)
 *G06F 3/0488* (2013.01)
 *G06F 3/0484* (2013.01)

(52) U.S. Cl.
 CPC ........ *G06F 3/04883* (2013.01); *G06F 3/04845* (2013.01)
 USPC ....................................... 345/173

(58) Field of Classification Search
 CPC .................. G06F 3/04845; G06F 3/04883
 USPC ........................................ 345/173
 See application file for complete search history.

(56) References Cited

U.S. PATENT DOCUMENTS

| | | | |
|---|---|---|---|
| 6,239,792 B1 | 5/2001 | Yanagisawa et al. | |
| 6,340,967 B1 | 1/2002 | Maxted | |
| 2006/0007123 A1* | 1/2006 | Wilson et al. | 345/156 |
| 2006/0077185 A1* | 4/2006 | Mashimo | 345/173 |
| 2007/0136462 A1* | 6/2007 | Nicholas | 709/224 |
| 2007/0270218 A1* | 11/2007 | Yoshida et al. | 463/37 |
| 2008/0044065 A1 | 2/2008 | Crockett et al. | |
| 2008/0050035 A1* | 2/2008 | Tsurumi | 382/276 |
| 2009/0303199 A1* | 12/2009 | Cho et al. | 345/173 |

FOREIGN PATENT DOCUMENTS

| | | |
|---|---|---|
| JP | 11-232479 | 8/1999 |
| JP | 2005-222514 | 8/2005 |

(Continued)

OTHER PUBLICATIONS

Search Report mailed Jul. 30, 2009 in corresponding European Application No. 09001253.5.

(Continued)

*Primary Examiner* — Quan-Zhen Wang
*Assistant Examiner* — Tony Davis
(74) *Attorney, Agent, or Firm* — Nixon & Vanderhye, P.C.

(57) ABSTRACT

A region in a displayed image is scraped away in accordance with a trail of touch with a touch pen or the like and an object showing "shavings" corresponding to the scraped-away region is generated. A display position of each of particles generated in accordance with a user's operation with the touch pen 27 or the like varies over time, in line with physical motion in accordance with actual gravity. Namely, a speed of each of the particles successively varies in accordance with prescribed acceleration (comparable to gravity) and the display position thereof is successively updated in accordance with the successively varying speed.

30 Claims, 22 Drawing Sheets

(56) References Cited

FOREIGN PATENT DOCUMENTS

| | | |
|---|---|---|
| JP | 2007-181163 | 7/2007 |
| JP | 2007265366 | 10/2007 |

OTHER PUBLICATIONS

Lorelei: "Using the Eraser Tool, Photoshop Basics" [Online] Feb. 19, 2008, XP002537035 Online retrieved from the Internet: URL: www.pswish.com/using-the-eraser-tool-photoshop-basics/> [retrieved on Apr. 20, 2009].

AB: "Adobe Photoshop Eraser Tool" [Online] Feb. 15, 2003, XP002537036 Online retrieved from the Internet: URL: www.hcgs.net/abweb/ps_eraser.html> [retrieved on Apr. 22, 2009].

Computer Centre: "Adobe Photoshop User Guide for Beginners" [Online] Aug. 25, 2000, XP002537037 Online retrieved from the Internet: URL: www.hku.hk/cc/document/photoshop/> [retrieved on Apr. 29, 2009].

Office Action in U.S. Appl. No. 12/255,969 dated Aug. 9, 2012.
Office Action in U.S. Appl. No. 12/255,969 dated Dec. 21, 2012.
Office Action in U.S. Appl. No. 12/255,969 dated Sep. 26, 2013.

* cited by examiner

CHANGE TARGET REGION
(PARTICLE GENERATED)

| COORDINATE | | A FLAG | R VALUE | G VALUE | B VALUE |
|---|---|---|---|---|---|
| X | Y | | | | |
| 0 | 0 | 1 | 16 | 16 | 31 |
| 1 | 0 | 1 | 16 | 31 | 16 |
| ⋮ | ⋮ | ⋮ | ⋮ | ⋮ | ⋮ |

| COORDINATE | | A FLAG | R VALUE | G VALUE | B VALUE |
|---|---|---|---|---|---|
| X | Y | | | | |
| 0 | 0 | 1 | 16 | 16 | 31 |
| 1 | 0 | 0 | 16 | 31 | 16 |
| ⋮ | ⋮ | ⋮ | ⋮ | ⋮ | ⋮ |

| CURRENT COORDINATE | | CURRENT SPEED | | COLOR INFORMATION | | | Dead/ Alive |
|---|---|---|---|---|---|---|---|
| $X_1$ | $Y_1$ | $V_x$ | $V_y$ | R | G | B | |
| 1 | 0 | 0 | 1.0 | 16 | 31 | 16 | 1 |

| CURRENT COORDINATE | | CURRENT SPEED | | COLOR INFORMATION | | | Dead/ Alive |
|---|---|---|---|---|---|---|---|
| $X_1$ | $Y_1$ | $V_x$ | $V_y$ | R | G | B | |
| 1 | 1 | 0 | 3.0 | 16 | 31 | 16 | 1 |

| CURRENT COORDINATE | | CURRENT SPEED | | COLOR INFORMATION | | | Dead/ Alive |
|---|---|---|---|---|---|---|---|
| $X_1$ | $Y_1$ | $V_x$ | $V_y$ | R | G | B | |
| 1 | 192 | 0 | 10.0 | 16 | 31 | 16 | 0 |

# STORAGE MEDIUM STORING IMAGE PROCESSING PROGRAM FOR IMPLEMENTING IMAGE PROCESSING ACCORDING TO INPUT COORDINATE, AND INFORMATION PROCESSING DEVICE

This nonprovisional application is based on Japanese Patent Application No. 2008-254003 filed with the Japan Patent Office on Sep. 30, 2008, the entire contents of which are hereby incorporated by reference.

FIELD OF THE INVENTION

The present invention relates to a storage medium storing an image processing program for implementing image processing according to a coordinate input through a user's operation and an information processing device.

DESCRIPTION OF THE BACKGROUND ART

An image processing technique allowing various edition operations desired by a user on an image displayed on a screen in response to a user's operation through a touch panel or the like has conventionally been known. Processing for having the user feel as if the user scraped away a part of an image has been proposed by way of example of such an image processing technique.

For example, Japanese Patent Laying-Open No. 2005-222514 discloses an autonomous heteronomous electronic scratch card capable of implementing a scratch card in real world on a screen of a personal or portable terminal. In addition, Japanese Patent Laying-Open No. 11-232479 discloses a video image display device displaying a video image including contents to permit a hidden image hidden behind a hiding image to appear and show itself.

The conventional techniques described above, however, do not pay attention to an effect during a user's "scraping away" operation. Namely, these conventional techniques merely change a manner of display of an image before and after the "scraping away" operation.

SUMMARY OF THE INVENTION

The present invention was made to solve such problems. An object of the present invention is to provide a storage medium storing an image processing program capable of providing a user with feeling closer to actual experience in connection with such an operation as scraping away an image and an information processing device.

According to a first aspect of the present invention, a storage medium storing an image processing program executed by a computer (100) representing an information processing device interacting with a display portion (12) and an input portion (13; a reference numeral used in embodiments; to be understood similarly hereinafter) detecting an input coordinate is provided. The image processing program causes the computer to execute: an image display control step (S300, S302, S304) of displaying a target image on the display portion; a color attribute change step (S100, S102, S104, S110, S112) of changing a color attribute of a change target region in the target image, which is a region corresponding to the input coordinate from the input portion; and a moving-state display step (S114, S116, S120 to S130, S140 to S152, S160, S200 to S218) of displaying a moving state of an object (200) having a color attribute in accordance with a color attribute before change of the change target region.

According to the first aspect, when the user operates the input portion (13) while the image is displayed on the display portion (12), the color attribute of the change target region (TRM) in the displayed image corresponding to the input coordinate detected by that operation is changed. Therefore, the user can feel as if the user were performing an operation to scrape away the displayed image through the operation of the input portion (13).

In addition, the object (200) is generated together with change of the color attribute. This object (200) has a color attribute in accordance with a color attribute before change of the change target region (TRM). Moreover, a display position of this generated object (200) varies over time. Namely, a new object is generated from a region scraped away by the user and the display position of the object varies over time. Thus, the user can see that the scraped-away region varies over time (for example, falls in a direction of gravity). Therefore, the user can obtain feeling closer to actual experience in connection with the operation to scrape away the image through his/her own operation.

Thus, according to the first aspect, such an effect as providing the user with feeling closer to actual experience in connection with the operation to scrape away the image can be provided.

According to a more preferred second aspect of the present invention, in the first aspect described above, the moving-state display step includes displaying a moving state of the object, with a position of the change target region serving as a movement start position (S124, S126).

According to a more preferred third aspect of the present invention, in the first aspect described above, the moving-state display step includes an object generation step (S122, S124, S144, S146) of generating the object when the color attribute of the change target region (TRM) is changed, and an object display position change step (S208, S210, S212) of varying over time a display position of the object generated in the object generation step.

According to a more preferred fourth aspect of the present invention, in the first aspect described above, the image processing program causes the computer to further execute an object erase step (S204, S206) of erasing the object after the moving state of the object is displayed.

Thus, according to the second to fourth aspects, an effect closer to actual experience can be provided, with regard to the object (200) generated by being scraped away from the image.

According to a more preferred aspect of the present invention, in the first aspect described above, the input portion (13) detects contact input to the display portion (12). According to this aspect, the user's operation is permitted through a display surface of the display portion (12) on which the image is displayed. Namely, the user can directly perform an operation on the image displayed on the display portion (12) to scrape away a desired region. Therefore, the user can more intuitively obtain feeling of scraping away the image.

According to a more preferred fifth aspect of the present invention, in the first aspect described above, the input portion (13) repeatedly obtains the input coordinate (S114, S126, S148, S218 to S214), and the moving-state display step includes obtaining a quantity of variation of the input coordinate, more specifically displacement of the input coordinate (a distance between two points), and starting movement of the object (200) at a speed in accordance with the quantity of variation (S146).

According to the fifth aspect, behavior of the generated object (200) is varied in accordance with a moving speed of the input coordinate that varies with the user's operation. For example, when the user quickly operates the input portion (13), the object (200) moves at a speed in coordination with that user's operation. Therefore, the user can obtain such feeling that shavings created when the image is scraped away scatter. Thus, according to the invention in the fifth aspect, an effect closer to actual experience can be provided, with regard to the object (200) generated by being scraped away from the image.

According to a more preferred sixth aspect of the present invention, in the first aspect described above, the input portion (13) repeatedly obtains the input coordinate (S114, S126, S148, S218 to S214), and the moving-state display step includes obtaining a direction of movement of the input coordinate and starting movement of the object (200) in a direction in accordance with the direction of movement.

According to the sixth aspect, behavior of the generated object (200) is varied in accordance with a direction of movement of the input coordinate that varies with the user's operation. For example, when the user operates the input portion (13) in a certain direction, the object (200) moves in a direction in coordination with that user's operation. Therefore, the user can obtain such feeling that shavings created when the image is scraped away scatter. Thus, according to the invention in the sixth aspect, an effect closer to actual experience can be provided, with regard to the object (200) generated by being scraped away from the image.

According to a more preferred aspect of the present invention, in the first aspect described above, the moving-state display step includes setting an initial value of a first speed component along a first direction and an initial value of a second speed component along a second direction different from the first direction (S126, S148), updating the first speed component in accordance with prescribed acceleration (S214), and displaying a moving state of the object based on the first and second speed components at each time point.

According to this aspect, the speed component in each of the first direction and the second direction orthogonal to each other is set as initial velocity of the object (200). Thereafter, the speed component in the first direction is successively updated over time in accordance with prescribed acceleration while the speed component in the second direction is maintained at the initial value. For example, assuming a direction of gravity as the first direction and a horizontal direction as the second direction, such physical motion that the generated object (200) falls in the direction of gravity can be expressed. Thus, according to the invention in this aspect, an effect further in line with actual behavior can be provided, with regard to the object (200) generated by being scraped away from the image.

According to a more preferred seventh aspect of the present invention, in the first aspect described above, the moving-state display step includes a variation quantity obtaining step of obtaining a quantity of variation of the input coordinate, a mode selection step of selecting any of first and second modes based on the quantity of variation, and an initial value setting step of setting an initial value of a first speed component along a first direction and an initial value of a second speed component along a second direction different from the first direction. The mode selection step includes selecting the first mode when the quantity of variation is smaller than a prescribed threshold value and selecting the second mode when the quantity of variation is greater than the prescribed threshold value. The initial value setting step includes setting an initial value of the first speed component to zero and randomly setting an initial value of the second speed component when the first mode is selected (S126), and setting the initial value of the first speed component based on a component of the moving speed along the first direction and a random value and setting the initial value of the second speed component based on a component of the moving speed along the second direction and a random value, when the second mode is selected (S148).

According to the seventh aspect, when the moving speed of the input coordinate is less than the prescribed threshold value, that is, when the moving speed is relatively low, the initial value of the first speed component (for example, a component in the horizontal direction) is set to zero and the initial value of the second speed component (for example, a component in the direction of gravity) is randomly set. On the other hand, when the moving speed of the input coordinate is equal to or greater than the prescribed threshold value, that is, when the moving speed is relatively high, the initial values of the first speed component (for example, the component in the horizontal direction) and the second speed component (for example, the component in the direction of gravity) are randomly set based on the moving speed of the input coordinate.

Thus, such an effect that, when the user slowly operates the input portion (13), shavings created when the image is scraped away mainly fall in the direction of gravity, and when the user quickly operates the input portion (13), shavings scatter at a speed in coordination with that user's operation is achieved. Thus, according to the invention in this seventh aspect, an effect closer to actual experience can be provided, with regard to the object (200) generated by being scraped away from the image.

According to a more preferred eighth aspect of the present invention, in the first aspect described above, the moving-state display step includes displaying, regarding a plurality of partial regions within the change target region, a moving state of objects each having a color attribute in accordance with a color attribute before change of the corresponding partial region.

According to a more preferred ninth aspect of the present invention, in the eighth aspect described above, the moving-state display step includes starting movement of each object after randomly setting at least one of a speed and a direction for each object.

According to the eighth and ninth aspects, the objects are successively generated through the user's operation of the input portion (13). Namely, as the user's operation is successively performed, a greater number of objects are generated. Thus, the user can obtain such feeling that more shavings are generated through a greater number of operations.

According to a more preferred aspect of the present invention, in the first aspect described above, the input portion repeatedly obtains the input coordinate. The color attribute change step includes changing the color attribute of a region in accordance with a trail of the input coordinate.

According to a more preferred tenth aspect of the present invention, in the second aspect described above, the moving-state display step includes displaying a moving state of the object in number in accordance with an area of the change target region.

According to the tenth aspect, the objects are successively generated in accordance with a size of an area of a region of which color attribute has been changed through the user's operation of the input portion (13). Namely, as the area of which color attribute has been changed through the user's operation increases, a greater number of objects are generated. Thus, the user can obtain such feeling that more shavings are generated by scraping away more regions.

According to a more preferred eleventh aspect of the present invention, in the tenth aspect described above, the moving-state display step includes newly displaying a moving state of the object in number in accordance with an area of a region of which change of a color attribute in the color attribute change step has newly been indicated.

According to the eleventh aspect, the objects corresponding to respective pixels of which color attribute has been changed through the user's operation of the input portion (13) are successively generated. Thus, the user can obtain such feeling that more shavings are generated by scraping away more regions.

In addition, as the color attribute of each object can also be the same as the color attribute of the corresponding pixel, an effect closer to actual shavings can also be achieved.

According to a more preferred twelfth aspect of the present invention, in the eleventh aspect described above, the color attribute change step includes setting, as a substantial change target region, a region in the change target region except for a region of which color attribute has already been changed and changing a color attribute only of the substantial change target region. The moving-state display step includes displaying a moving state of the object in number in accordance with an area of the substantial change target region of which color attribute has been changed in the color attribute change step.

According to a more preferred thirteenth aspect of the present invention, in the first aspect described above, the target image includes a plurality of pixels each having the color attribute. The moving-state display step includes displaying a moving state of a plurality of objects corresponding to a plurality of pixels included in the change target region respectively, and a color attribute of each object is in accordance with the color attribute of each pixel before change. The color attribute change step includes changing a color attribute of the change target region in the target image to a transparent color attribute.

According to a more preferred fourteenth aspect of the present invention, in the tenth aspect described above, the moving-state display step includes lowering, when an area of a region of which change of a color attribute in the color attribute change step has newly been indicated is great, a ratio of the number of objects of which moving state is to be newly displayed to the area of that region.

According to the fourteenth aspect, a ratio of generation of the objects is changed in accordance with the moving speed of the input coordinate, and representatively, the generated objects are thinned out. Namely, in a case where generation of too many objects (200) per a unit time is expected due to too fast a user's input operation, the number of generated objects can be suppressed. Thus, considerable increase in a quantity of image processing for updating the display position of each object (200) can be suppressed. In other words, image processing according to the present invention can be implemented also on hardware of which image processing capability is limited.

According to a more preferred fifteenth aspect of the present invention, in the first aspect described above, the moving-state display step includes displaying, regarding only a target region in the change target region set in advance with respect to the target image, a moving state of an object having a color attribute in accordance with a color attribute of that target region before change.

According to a more preferred sixteenth aspect of the present invention, in the fifteenth aspect described above, the target image includes a plurality of pixels each having a color attribute, and the target region is set as a grid-like region including a pixel having a prescribed coordinate value.

According to sixteenth aspect, in lowering a ratio of generation of the objects, the object (200) is generated only from a portion included in the grid-like region set in advance, out of the region of which color attribute has been changed. Namely, in changing the ratio of generation of the objects (200), only the portion of which color attribute has been changed in the grid-like region set in advance should only be specified. Therefore, it is not necessary to use a complicated function or the like for changing the ratio of generation of the objects (200), and a quantity of operation can further be decreased.

According to a more preferred seventeenth aspect of the present invention, in the first aspect described above, the image processing program causes the computer to further execute a sound generation step of generating sound together with change of the color attribute in the color attribute change step. The moving-state display step includes displaying a moving state of an object having a color attribute in accordance with a color attribute of each pixel included in the change target region, for each that pixel. The sound generation step includes changing sound to be generated, in accordance with the number of pixels of which color attribute has been changed in the color attribute change step.

According to a more preferred aspect of the present invention, in the seventeenth aspect described above, changing of the sound includes increasing a volume of generated sound as the number of pixels of which color attribute has been changed in the color attribute change step is greater.

According to a more preferred eighteenth aspect of the present invention, in the seventeenth aspect described above, changing of the sound includes increasing the number of generated sounds as the number of pixels of which color attribute has been changed in the color attribute change step is greater.

According to a more preferred nineteenth aspect of the present invention, in the seventeenth aspect described above, changing of the sound includes generating, when a color attribute of a single pixel has been changed in the color attribute change step, sound different from sound generated when a color attribute of a plurality of pixels has been changed in the color attribute change step.

According to a twentieth aspect of the present invention, an information processing device (100) interacting with a display portion (12) and an input portion (13) detecting an input coordinate is provided. The information processing device includes: an image display control portion displaying a target image on the display portion; a color attribute change portion (306; S104) changing a color attribute of a change target region (TRM) in the target image which is a region corresponding to the input coordinate from the input portion; and a moving-state display portion (308, 310, 312, 314; S114, S126, S148, S218 to S214) displaying a moving state of an object having a color attribute in accordance with a color attribute before change of the change target region.

According to the twentieth aspect, when the user operates the input portion (13) while the image is displayed on the display portion (12), the color attribute of the change target region (TRM) in the displayed image corresponding to the input coordinate detected by that operation is changed. Therefore, the user can feel as if the user were performing an operation to scrape away the displayed image through the operation of the input portion (13).

According to the invention in this aspect, when the user operates the input portion (13) while the image is displayed on the display portion, the color attribute of the region (TRM) in the displayed image corresponding to the input coordinate detected by that operation is changed. Therefore, the user can feel as if the user were performing an operation to scrape away the displayed image through the operation of the input portion (13).

In addition, the object (200) is generated together with change of the color attribute. This object (200) has the color attribute in accordance with the color attribute before change of that region (TRM). Moreover, a display position of this generated object (200) varies over time. Namely, a new object is generated from a region scraped away by the user and the display position of the object varies over time. Thus, the user can see that the region scraped away by himself/herself varies over time (for example, falls in a direction of gravity). Therefore, the user can obtain feeling closer to actual experience in connection with the operation to scrape away the image through his/her own operation.

Thus, according to the invention in this aspect, such an effect as providing the user with feeling closer to actual experience in connection with the operation to scrape away the image can be provided.

In the description above, reference numerals for indicating correspondence with embodiments which will be described later, supplemental explanation and the like are provided for better understanding of the present invention, however, they are not intended to limit the present invention in any manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
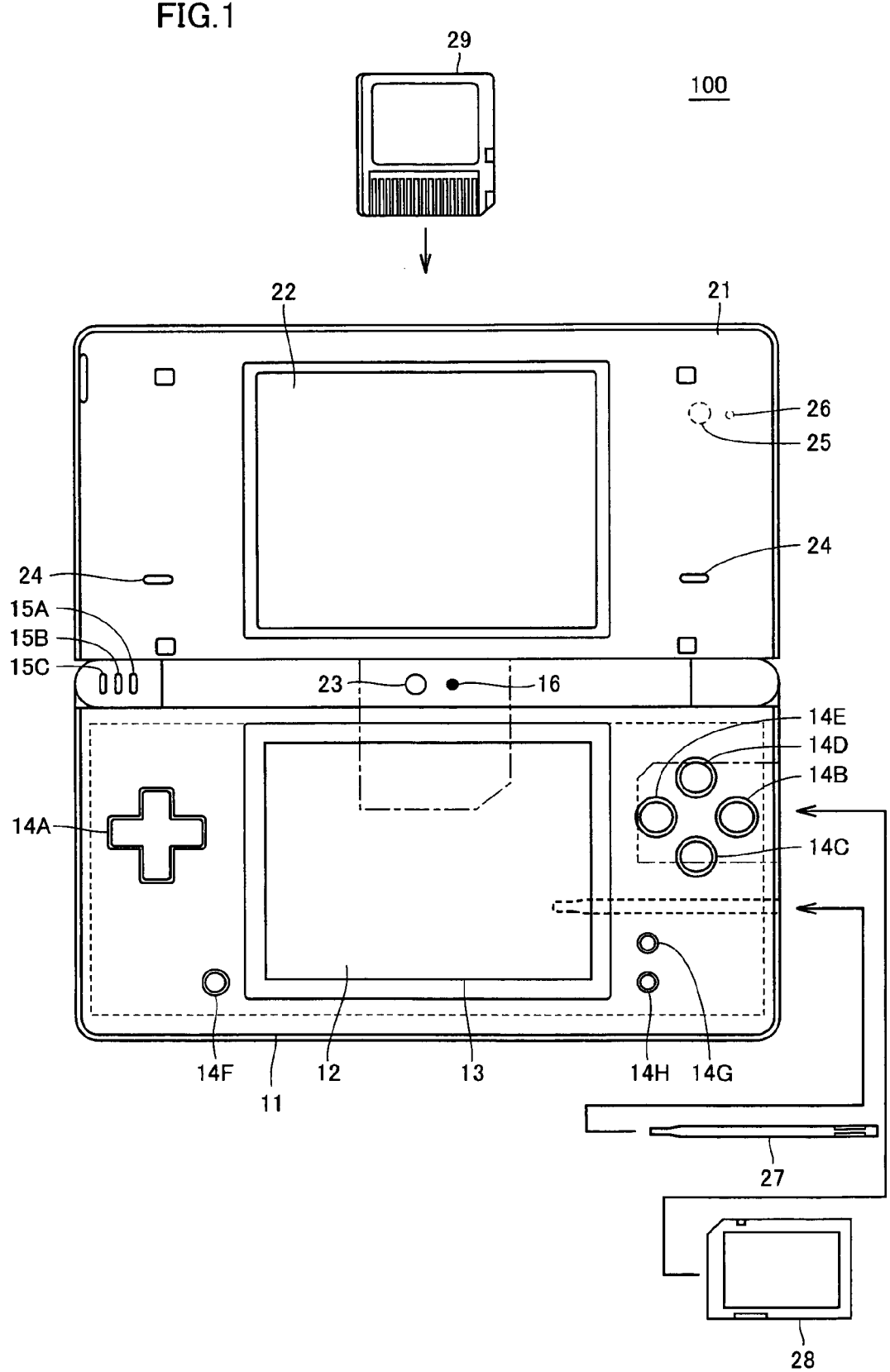
FIG. 1 shows appearance of a game device according to an embodiment of the present invention.

An embodiment of the present invention will be described in detail with reference to the drawings. The same or corresponding elements in the drawings have the same reference characters allotted, and detailed description thereof will not be repeated.

A game device 100 will be described hereinafter as a representative example of a computer or an information processing device according to the present invention. In addition, a program executed by game device 100 will be described by way of example of an image processing program according to the present invention. It is noted that the information processing device according to the present invention is not limited to a game device, and it may be implemented as a personal computer capable of executing various applications. In addition, the image processing program according to the present invention may be incorporated as a function of some of various applications executed on a personal computer. It is noted here that "to interact with" means that the input portion and the display portion are connected to the computer through wired or wireless connection to allow communication of data. An "interacting" configuration encompasses an example where the input portion and/or the display portion are/is integrally formed with a computer main unit and an example where they are provided separately from the computer main unit.

Further, regarding the input portion, in a case of a portable device as will be described later, a touch panel is preferred, however, a mouse or the like may alternatively be adopted. Alternatively, a pointer capable of indicating a coordinate remotely from a display monitor (typically, a controller or the like of Wii® manufactured and marketed by Nintendo, Co., Ltd.) may be employed. In the case of a mouse or a pointer, a "touch on" coordinate in embodiments described later can be a coordinate detected when a prescribed operation (such as a button operation) is performed, and determination as "a touch state being continued" can be made on condition that a prescribed operation is continued (for example, the button operation is continued).

<Appearance of Game Device>

FIG. 1 shows appearance of game device 100 according to an embodiment of the present invention.

Referring to FIG. 1, game device 100 according to the present embodiment is a foldable-type portable game device. FIG. 1 shows game device 100 in an unfolded state (opened state). Game device 100 is configured to have such a size that a user can hold game device 100 with both hands or one hand even in the unfolded state.

Game device 100 has a lower housing 11 and an upper housing 21. Lower housing 11 and upper housing 21 are coupled to allow opening and closing (be foldable). In the example shown in FIG. 1, lower housing 11 and upper housing 21 are each formed like a horizontally long, rectangular plate, and they are coupled to each other to be pivotable around a long side portion thereof.

Normally, the user uses game device 100 in the opened state. In addition, the user stores game device 100 in a closed state when he/she does not use game device 100. In the example shown in FIG. 1, game device 100 can not only be in the closed state or the opened state but also be held at any angle between the closed state and the opened state that is formed by lower housing 11 and upper housing 21, by means of friction force generated in a coupling portion. Namely, upper housing 21 can be stopped at any angle with respect to lower housing 11.

A lower LCD (Liquid Crystal Display) 12 is provided as the display portion (display means) in lower housing 11. Lower LCD 12 is in a horizontally long shape and it is arranged such that a direction in which its long side extends coincides with a direction in which a long side of lower housing 11 extends. In the present embodiment, though an LCD is employed as the display portion (display means) mounted on game device 100, any other display device such as a display device utilizing EL (Electro Luminescence) may be employed. In addition, game device 100 can employ a display device of any resolution.

Operation buttons 14A to 14H are provided as the input portion (input means) in lower housing 11. As shown in FIG. 1, among operation buttons 14A to 14H, a direction input button 14A, an operation button 14B, an operation button 14C, an operation button 14D, an operation button 14E, a power button 14F, a start button 14G, and a select button 14H are provided on an inner main surface of lower housing 11, which is located on the inner side when upper housing 21 and lower housing 11 are folded.

Direction input button 14A is used, for example, for a selection operation. Operation buttons 14B to 14E are used, for example, for an enter operation or a cancel operation. Power button 14F is used for turning on/off the power of game device 100. In the example shown in FIG. 1, direction input button 14A and power button 14F are provided on the inner main surface on one of left and right sides (left side in FIG. 1) of lower LCD 12 provided around the center of the inner main surface of lower housing 11.

In addition, operation buttons 14B to 14E, start button 14G, and select button 14H are provided on the inner main surface of lower housing 11 on the other of left and right sides (right side in FIG. 1) of lower LCD 12. Direction input button 14A, operation buttons 14B to 14E, start button 14G, and select button 14H are used for performing various operations on game device 100.

Operation buttons 14I to 14K not shown in FIG. 1 may further be provided in game device 100. For example, an L button 14I is provided at a left end portion of an upper side surface of lower housing 11, and an R button 14J is provided at a right end portion on the upper side surface of lower housing 11. L button 14I and R button 14J are used, for example, for performing an image storage instruction operation (shutter operation) on game device 100. In addition, a volume button 14K is provided on a left side surface of lower housing 11. Volume button 14K is used for adjusting a volume of a speaker included in game device 100.

In addition, game device 100 further includes a touch panel 13 as the input portion (input means) different from operation buttons 14A to 14H. Touch panel 13 is attached to cover a screen of lower LCD 12.

In the present embodiment, touch panel 13 is arranged in association with a display surface of lower LCD 12, and for example, a resistive touch panel is employed. It is noted that touch panel 13 is not limited to the resistive type and any pressing-type touch panel may be adopted.

In the present embodiment, for example, a touch panel having resolution (detection accuracy) as high as that of lower LCD 12 is employed as touch panel 13. It is noted that the resolution of touch panel 13 does not necessarily have to be equal to the resolution of lower LCD 12.

In addition, an insertion opening (dashed line shown in FIG. 1) for a touch pen 27 is provided in a right side surface of lower housing 11. Touch pen 27 used for performing an operation on touch panel 13 can be accommodated in the insertion opening. Normally, input to touch panel 13 is made by using touch pen 27, however, touch panel 13 can be operated with a finger of the user, without limited to touch pen 27.

Moreover, an insertion opening (shown with a chain-double-dotted line in FIG. 1) for accommodating a memory card 28 is provided in the right side surface of lower housing 11. A connector (not shown) for electrically connecting game device 100 and memory card 28 with each other is provided in the inside of this insertion opening. Memory card 28 is implemented, for example, by an SD (Secure Digital) memory card and removably attached to the connector. Memory card 28 is used, for example, for storing (saving) an image picked up and/or processed by game device 100 or for reading an image generated by another device into game device 100.

Further, an insertion opening (shown with a chain-dotted line in FIG. 1) for accommodating a memory card 29 is provided in the upper side surface of lower housing 11. A connector (not shown) for electrically connecting game device 100 and memory card 29 with each other is provided also in the inside of this insertion opening. Memory card 29 is a storage medium storing a program, a game program or the like, and it is removably attached to the insertion opening provided in lower housing 11.

Three LEDs 15A to 15C are disposed in a portion on the left of the coupling portion of lower housing 11 and upper housing 21. Game device 100 according to the present embodiment can establish wireless communication with other equipment, and a first LED 15A illuminates when wireless communication is established. A second LED 15B illuminates while game device 100 is being charged. A third LED 15C illuminates when the power of game device 100 is turned on. Therefore, three LEDs 15A to 15C can notify the user of a state of communication establishment, a state of charge, and a state of power on/off of game device 100, respectively.

On the other hand, an upper LCD 22 is provided in upper housing 21. Upper LCD 22 has a horizontally long shape and it is arranged such that a direction in which its long side extends coincides with a direction in which a long side of upper housing 21 extends. As in lower LCD 12, a display device of any other type and of any other resolution may be employed instead of upper LCD 22. A touch panel may be provided to cover upper LCD 22.

In addition, two cameras (an inner camera 23 and an outer camera 25) each serving as an image pick-up device are provided in upper housing 21. As shown in FIG. 1, inner camera 23 is disposed in an inner main surface of upper housing 21 around the coupling portion. On the other hand, outer camera 25 is disposed in a surface opposite to the inner main surface where inner camera 23 is disposed, that is, to an outer main surface of upper housing 21 (a surface on the outside when game device 100 is in the closed state and a back surface of upper housing 21 shown in FIG. 1). In FIG. 1, outer camera 25 is shown with a dashed line.

Thus, inner camera 23 can pick up an image in a direction in which the inner main surface of upper housing 21 faces, and outer camera 25 can pick up an image in a direction opposite to the direction of image pick-up by inner camera 23, that is, in a direction in which the outer main surface of upper housing 21 faces.

In this manner, in the present embodiment, two cameras, that is, inner camera 23 and outer camera 25, are provided such that the directions of image pick-up are opposite to each other. For example, the user can pick up with inner camera 23, an image of a view in a direction from game device 100 toward the user, and can pick up with outer camera 25, an image of a view from game device 100 toward a side opposite to the user.

In some cases, lower LCD 12 and/or upper LCD 22 may be used for displaying an image picked up by inner camera 23 or outer camera 25 in real time.

In addition, a microphone (a microphone 43 shown in FIG. 2) is accommodated as an audio input device in the inner main surface around the coupling portion above. In the inner main surface around the coupling portion above, a microphone hole 16 is formed such that microphone 43 can sense sound outside game device 100. A position where microphone 43 is accommodated and a position of microphone hole 16 do not necessarily have to be in the coupling portion above, and for example, microphone 43 may be accommodated in lower housing 11 and microphone hole 16 may be provided in lower housing 11 in correspondence with the position of accommodation of microphone 43.

Moreover, a fourth LED 26 (shown with a dashed line in FIG. 1) is disposed in the outer main surface of upper housing 21. Fourth LED 26 illuminates while inner camera 23 or outer camera 25 is picking up an image. Alternatively, fourth LED 26 may blink while a motion picture is being picked up (picked-up images are stored as motion picture) by inner camera 23 or outer camera 25.

In order to prevent illumination of the LED from entering the screen, fourth LED 26 may be turned off from the moment of pressing of a shutter until completion of storage of the image picked up at the moment of pressing of the shutter. Fourth LED 26 can notify a subject or a person nearby that the image pick-up by game device 100 is being performed.

In addition, a sound emission hole 24 is formed in the inner main surface of upper housing 21, on each of left and right sides of upper LCD 22 provided around the center of the inner main surface. A speaker is accommodated in upper housing 21 in the rear of sound emission hole 24. Sound emission hole 24 is a hole for emitting sound from the speaker to the outside of game device 100.

As described above, upper housing 21 is provided with inner camera 23 and outer camera 25 that are features for picking up an image as well as upper LCD 22 serving as the display portion for displaying various images. On the other hand, lower housing 11 is provided with the input portion (touch panel 13 and buttons 14A to 14K) for providing operation inputs to game device 100 as well as lower LCD 12 serving as the display portion for displaying various images.

The input device can be used for such applications that the user holds lower housing 11 to provide inputs to the input device while the picked-up image (the image picked up by the camera) is displayed on lower LCD 12 or upper LCD 22 in use of game device 100.

<Internal Configuration of Game Device>

Figure 2:
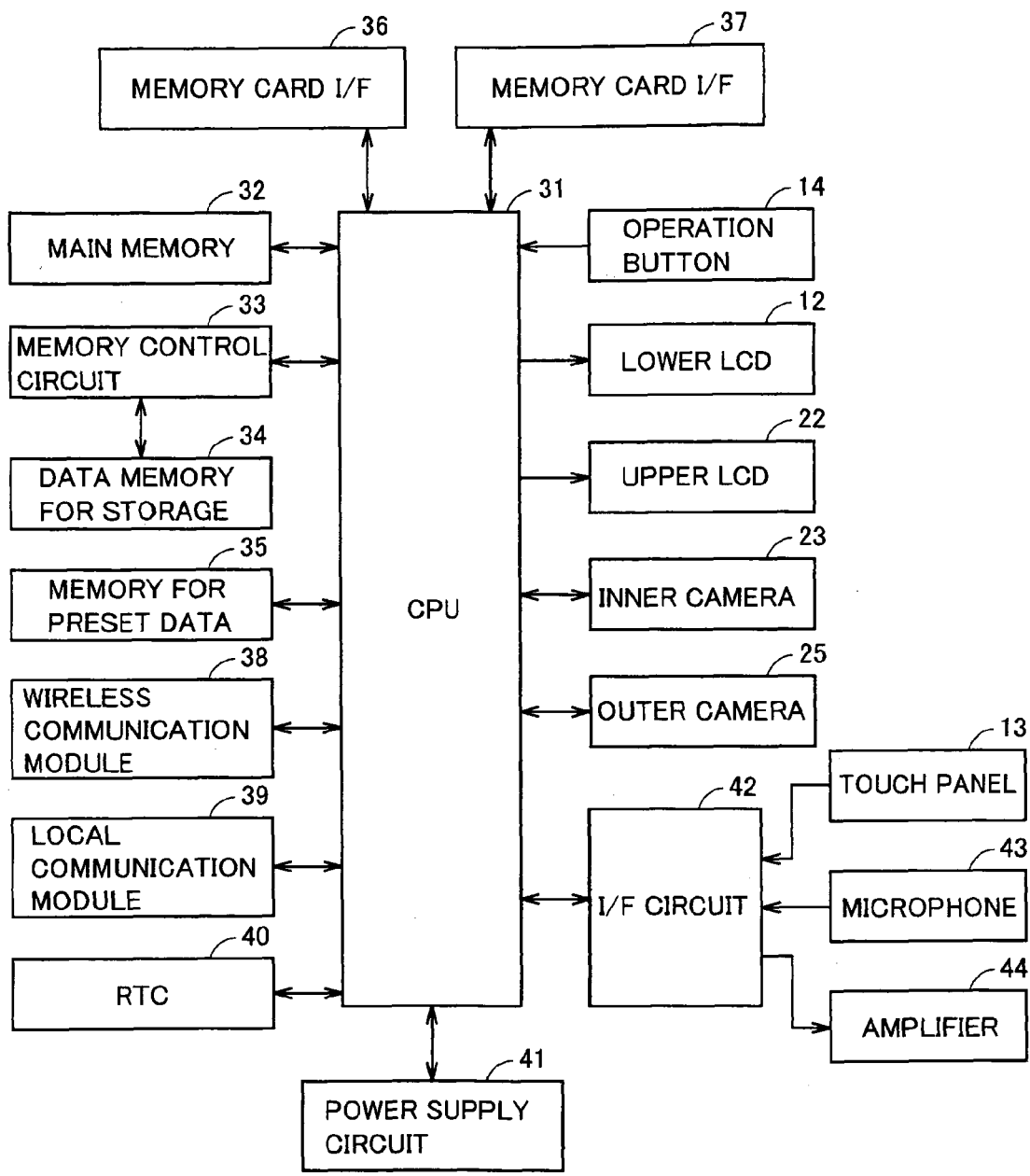
FIG. 2 is a block diagram showing an exemplary internal configuration of the game device according to the embodiment of the present invention.

FIG. 2 is a block diagram showing an exemplary internal configuration of game device 100 according to the embodiment of the present invention.

Referring to FIG. 2, game device 100 includes such electronic parts as a CPU 31, a main memory 32, a memory control circuit 33, a data memory 34 for storage, a memory 35 for preset data, memory card interfaces (memory card I/F) 36 and 37, a wireless communication module 38, a local communication module 39, a real time clock (RTC) 40, a power supply circuit 41, and an interface circuit (I/F circuit) 42. These electronic parts are mounted on an electronic circuit substrate and accommodated in lower housing 11 (or may be accommodated in upper housing 21).

CPU 31 is an operation processing unit for executing a prescribed program. In the present embodiment, a prescribed program is recorded in a memory (such as data memory 34 for storage) within game device 100 or memory card 28 and/or 29, and CPU 31 performs image processing which will be described later by executing the prescribed program. The program executed by CPU 31 may be recorded in advance in a memory within game device 100, obtained from memory card 28 and/or 29, or obtained from other equipment through communication with other equipment.

Main memory 32, memory control circuit 33 and memory 35 for preset data are connected to CPU 31. In addition, data memory 34 for storage is connected to memory control circuit 33.

Main memory 32 is a storage portion used as a work area or a buffer area of CPU 31. Namely, main memory 32 stores various types of data used for information processing above or stores a program obtained from the outside (memory cards 28 and 29, other equipment, and the like). In the present embodiment, for example, a PSRAM (Pseudo-SRAM) is employed as main memory 32.

Data memory 34 for storage is a storage portion for storing a program executed by CPU 31, data of images picked up by inner camera 23 and outer camera 25, and the like. Data memory 34 for storage is implemented by a non-volatile storage medium, and for example, it is implemented by a NAND-type flash memory in the present embodiment. Memory control circuit 33 is a circuit controlling reading and writing of data from/to data memory 34 for storage in accordance with an instruction from CPU 31.

Memory 35 for preset data is a storage portion for storing data such as various parameters set in advance in game device 100 (preset data). A flash memory connected to CPU 31 through an SPI (Serial Peripheral Interface) bus may be employed as memory 35 for preset data.

Memory card I/Fs 36 and 37 are each connected to CPU 31. Memory card I/F 36 performs reading and writing of data from/to memory card 28 attached to the connector in response to an instruction from CPU 31. In addition, memory card I/F 37 performs reading and writing of data from/to memory card 29 attached to the connector in response to an instruction from CPU 31.

In the present embodiment, data of images picked up by inner camera 23 and outer camera 25 or image data received from other devices is written in memory card 28, or image data stored in memory card 28 is read from memory card 28 and stored in data memory 34 for storage or transmitted to other devices. In addition, various programs stored in memory card 29 are read and executed by CPU 31.

The image processing program according to the present invention is supplied not only to a computer system through an external storage medium such as memory card 29 but also to a computer system through a wired or wireless communication line. Alternatively, the image processing program may be stored in advance in a non-volatile storage device within the computer system. The storage medium storing the image processing program is not limited to the non-volatile storage device above, and an optical, disc-like storage medium such as a CD-ROM, a DVD, or a similar medium may be employed.

Wireless communication module 38 has a function for connection to wireless LAN, for example, in compliance with IEEE 802.11b/g specifications. In addition, local communication module 39 has a function to establish wireless communication with a game device of a similar type under a prescribed communication scheme. Wireless communication module 38 and local communication module 39 are connected to CPU 31. CPU 31 can transmit and receive data to/from other equipment through the Internet by using wireless communication module 38, or transmit and receive data to/from another game device of a similar type by using local communication module 39.

In addition, RTC 40 and power supply circuit 41 are connected to CPU 31. RTC 40 counts time and outputs the counted time to CPU 31. For example, CPU 31 is also able to calculate current time (date) or the like based on the time counted by RTC 40. Power supply circuit 41 controls electric power supplied from a power supply of game device 100 (typically, a battery housed in lower housing 11) and supplies electric power to each part of game device 100.

Moreover, game device 100 includes microphone 43 and amplifier 44. Microphone 43 and amplifier 44 are connected to I/F circuit 42. Microphone 43 senses voice and sound of the user issued toward game device 100 and outputs an audio signal indicating the voice and sound to I/F circuit 42. Amplifier 44 amplifies the audio signal from I/F circuit 42 and causes the audio signal to be output from the speaker (not shown). I/F circuit 42 is connected to CPU 31.

Further, touch panel 13 is connected to I/F circuit 42. I/F circuit 42 includes an audio control circuit controlling microphone 43 and amplifier 44 (speaker) and a touch panel control circuit controlling touch panel 13.

The audio control circuit performs A/D conversion and D/A conversion of the audio signal, and converts the audio signal to audio data in a prescribed format.

The touch panel control circuit generates touch position data in a prescribed format based on a signal from touch panel 13 and outputs the data to CPU 31. For example, the touch position data is coordinate data indicating a position where input to an input surface of touch panel 13 was made (hereinafter also referred to as an "input coordinate"). Here, the touch panel control circuit performs reading of a signal from touch panel 13 and generation of the touch position data once in a prescribed period of time.

CPU 31 can detect an input coordinate input through the user's operation of touch panel 13 by obtaining the touch position data through I/F circuit 42.

Operation button 14 is constituted of operation buttons 14A to 14K above and connected to CPU 31. Operation data indicating a state of input to each of operation buttons 14A to 14K (whether the button was pressed or not) is output from operation button 14 to CPU 31. CPU 31 performs processing in accordance with the input to operation button 14 by obtaining the operation data from operation button 14.

Inner camera 23 and outer camera 25 are each connected to CPU 31. Inner camera 23 and outer camera 25 pick up an image in response to an instruction from CPU 31 and output data of the picked-up image to CPU 31. For example, CPU 31 issues an image pick-up instruction to any one of inner camera 23 and outer camera 25, and the camera that received the image pick-up instruction picks up an image and sends the image data to CPU 31.

In addition, lower LCD 12 and upper LCD 22 are each connected to CPU 31. Lower LCD 12 and upper LCD 22 display an image in response to an instruction from CPU 31. For example, CPU 31 causes one of lower LCD 12 and upper LCD 22 to display the image obtained from any of inner camera 23 and outer camera 25, and causes the other of lower LCD 12 and upper LCD 22 to display an operation guidance picture generated through prescribed processing.

<Outlines of Image Processing According to the Present Embodiment>

Outlines of image processing according to the present embodiment will now be described with reference to FIGS. 3 to 8.

Figure 3:
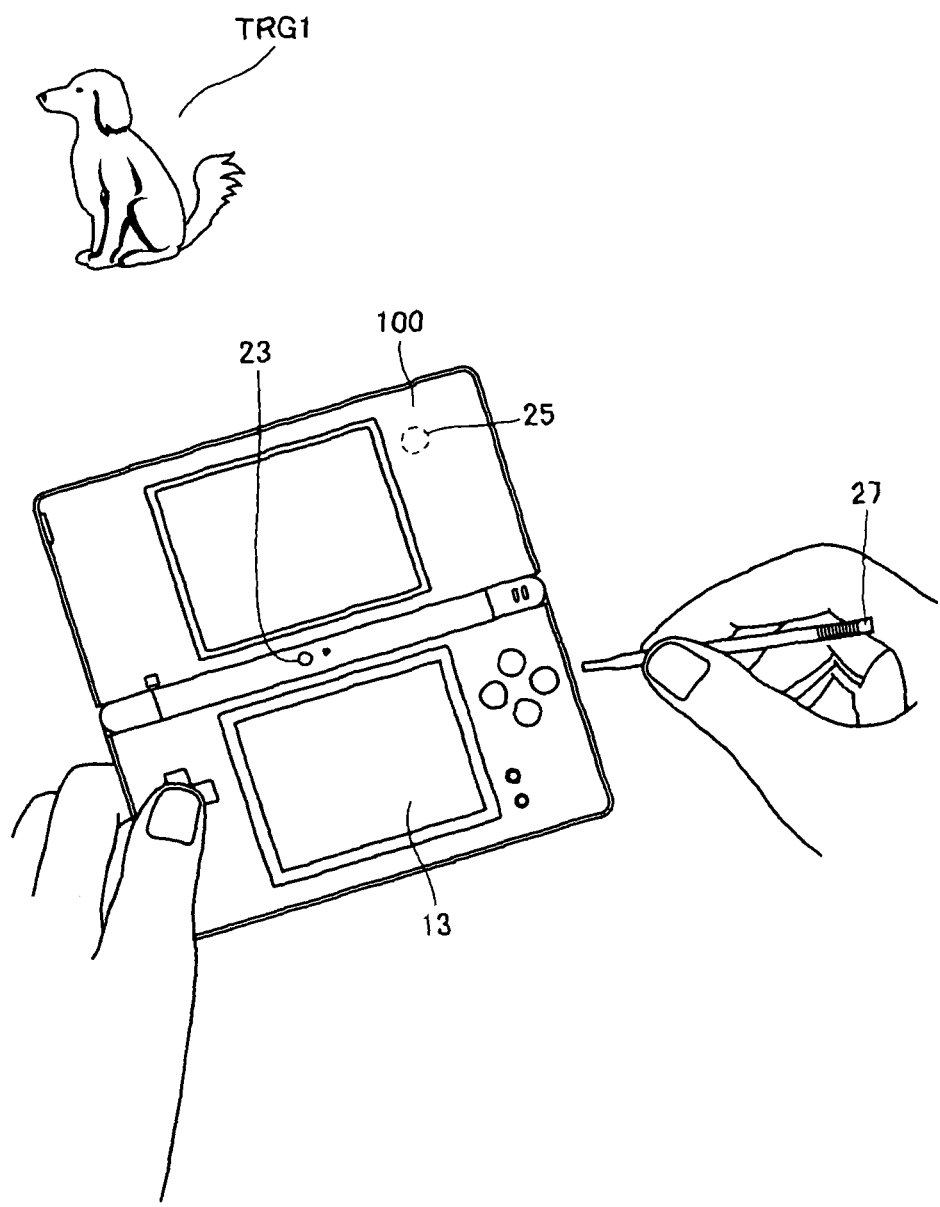
FIG. 3 is a diagram showing exemplary usage of the game device according to the embodiment of the present invention.

FIG. 3 is a diagram showing exemplary usage of game device 100 according to the embodiment of the present invention. Referring to FIG. 3, in game device 100, an image, for example, of a subject TRG1 picked up by the mounted camera (inner camera 23 or outer camera 25; hereinafter these cameras may simply collectively be referred to as a "camera") is displayed on lower LCD 12. The user can use touch pen 27, his/her own finger or the like (hereinafter, referred to as "touch pen 27 etc.") to operate touch panel 13 arranged on lower LCD 12 and perform an edition operation on this displayed image.

In this edition operation, a frame image can be created by "scraping away" a part of the displayed image. In addition, the frame image created in advance can be displayed in a manner superimposed on the picked-up image. Game device 100 according to the present embodiment can cause lower LCD 12 to display a picked-up image obtained by inner camera 23 or outer camera 25 as a Live image (a picked-up image displayed in real time) and the frame image in a manner superimposed on that Live image. Moreover, game device 100 can store an image displayed on lower LCD 12 at the time point when an image storage instruction operation is provided while the frame image is displayed over the Live image, that is, an image obtained by superimposing the frame image on the picked-up image.

Here, an image stored in advance in memory card 28 (FIG. 2) or the like in addition to an image picked up by the camera and stored immediately before (hereinafter, referred to as the "input image") may be used as an original image for creating the frame image. Further, the image created by superimposing the frame image on the picked-up image can also be stored in memory card 28 or the like.

Though the image of subject TRG is picked up by outer camera 25 in the example shown in FIG. 3, the image of subject TRG may be picked up by inner camera 23, and the user can arbitrarily select which camera to use.

Figure 4:
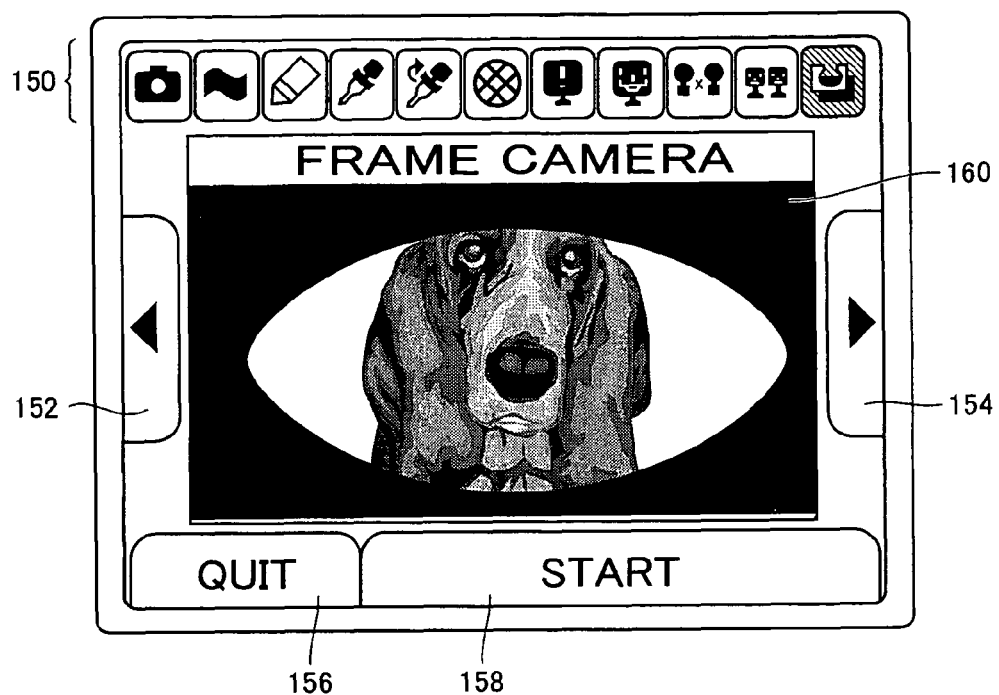
FIG. 4 is a diagram showing an exemplary selection screen in the game device according to the embodiment of the present invention.

FIG. 4 is a diagram showing an exemplary selection screen in game device 100 according to the embodiment of the present invention. Referring to FIG. 4, game device 100 according to the present embodiment is provided with a plurality of functions including a function to allow the user to create a frame image described above, and the user selects a desired function on the selection screen shown in FIG. 4.

In the example shown in FIG. 4, a plurality of icons 150 corresponding to respective functions provided in game device 100 are displayed in an upper portion of the screen, and the user can arbitrarily select an icon corresponding to a desired function from among these icons 150. In addition, selection buttons 152 and 154 are displayed on opposing sides of the screen. Each time the user selects selection button 152 or 154, the selected function is successively changed toward the left or toward the right, along arrangement of icons 150.

When a "start" button 158 is selected after the user selects the function in such a manner, the selected function is executed. In addition, when a "quit" button 156 is selected, the screen returns to a not-shown menu screen.

In addition, as shown in FIG. 4, a name of the selected function (in the example shown in FIG. 4, "frame camera") and outlines of that processing are shown in a preview region 160, so as to present to the user contents of the function corresponding to icon 150 selected by the user.

Figure 5:
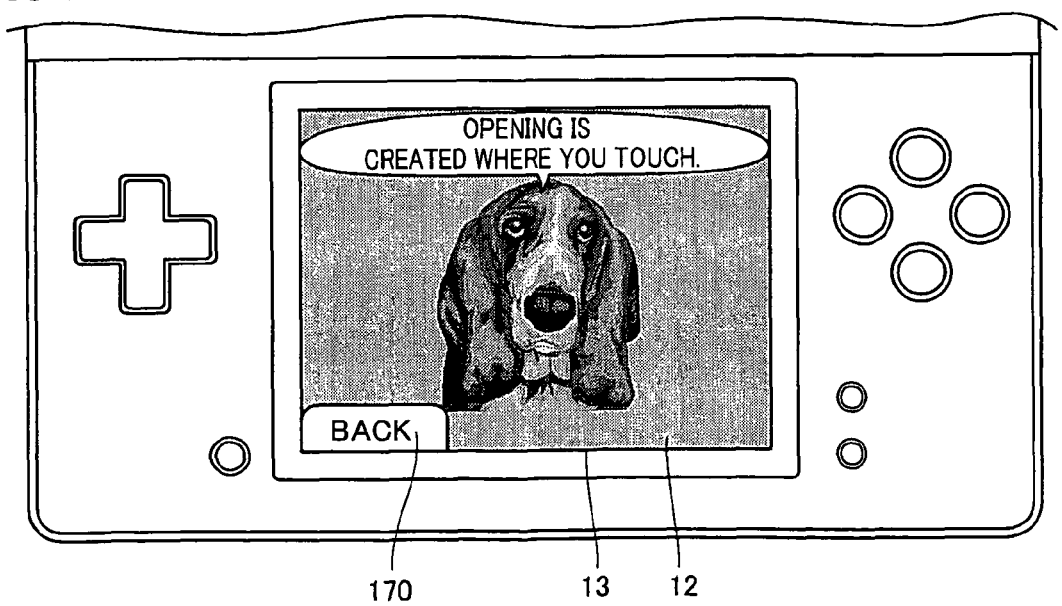
FIG. 5 is a diagram showing a screen display example (No. 1) relating to creation of a frame image.
Figure 6:
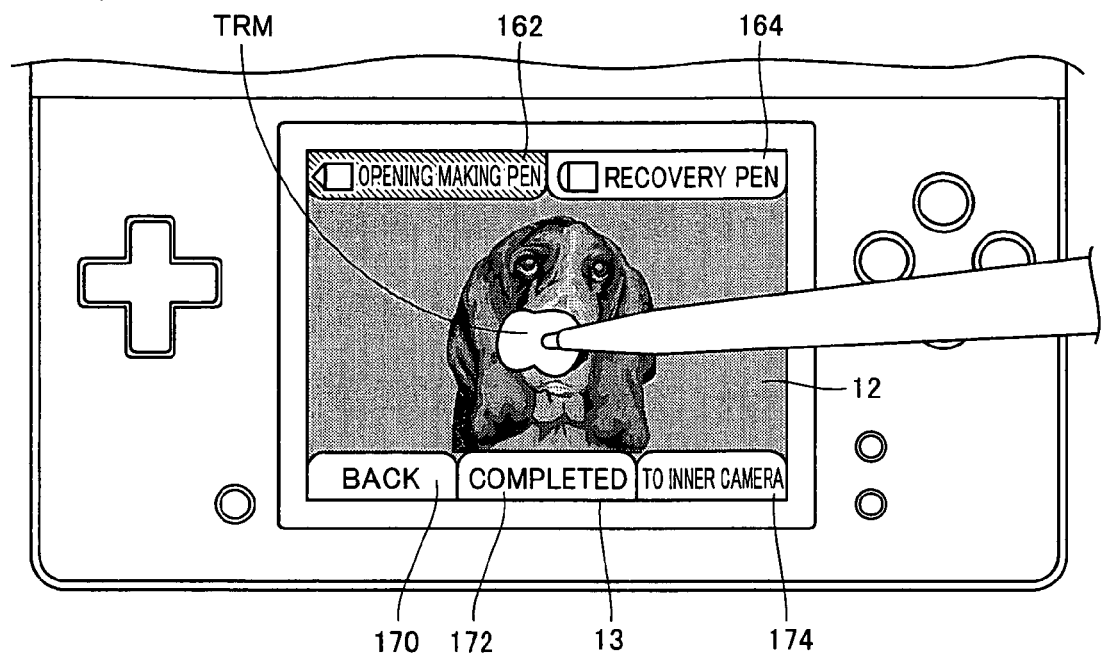
FIG. 6 is a diagram showing a screen display example (No. 2) relating to creation of a frame image.

FIGS. 5 and 6 show screen display examples when the frame image is created. Referring to FIG. 5, the picked-up image of subject TRG1 (FIG. 3) is displayed on the display surface of lower LCD 12. In addition, a message that "opening is created where you touch" is displayed in the upper portion of the screen. It is noted that a "back" button 170 is displayed in a lower left portion of the screen. When this button 170 is selected, transition to an immediately preceding screen is made.

As will be described later, when the user performs a touch operation with touch pen 27 etc. on the screen as shown in FIG. 5, an effect as if the touched portion of the displayed image were scraped away is obtained. Then, when some kind of edition operation is performed on the screen as shown in FIG. 5, transition to the screen as shown in FIG. 6 is made.

FIG. 6 shows a case where an opening region TRM has been created in a central portion of the displayed image as a result of touch with touch pen 27 etc. onto the screen. This opening region TRM is a region not having effective color information as will be described later. Namely, in response to the input coordinate detected by touch panel 13, the color attribute of the change target region corresponding to the input coordinate of the displayed image is changed.

In the screen shown in FIG. 6, an "opening making pen" button 162 and a "recovery pen" button 164 are displayed in the upper portion of the screen. Button 162 is used for selecting and displaying a mode for scraping away the displayed image in accordance with the touch operation. Button 164 is used for selecting and displaying a mode recovering the scraped-away portion to the original state in accordance with the touch operation.

In addition, in the screen shown in FIG. 6, "back" button 170, a "completed" button 172 and a switch button 174 are displayed in a lower portion of the screen. When button 170 is selected, the "frame camera" processing is stopped and transition to the immediately preceding screen is made. Alternatively, when button 172 is selected, a still image corresponding to the image displayed at selected timing is generated and stored in data memory 34 for storage (FIG. 2) or the like. Alternatively, when switch button 174 is selected, the camera to be used for image pick-up is switched between inner camera 23 and outer camera 25.

After the frame image is generated through the operation as above, the user can pick up an image of another subject and superimpose the frame image on this picked-up image for display.

Figure 7:
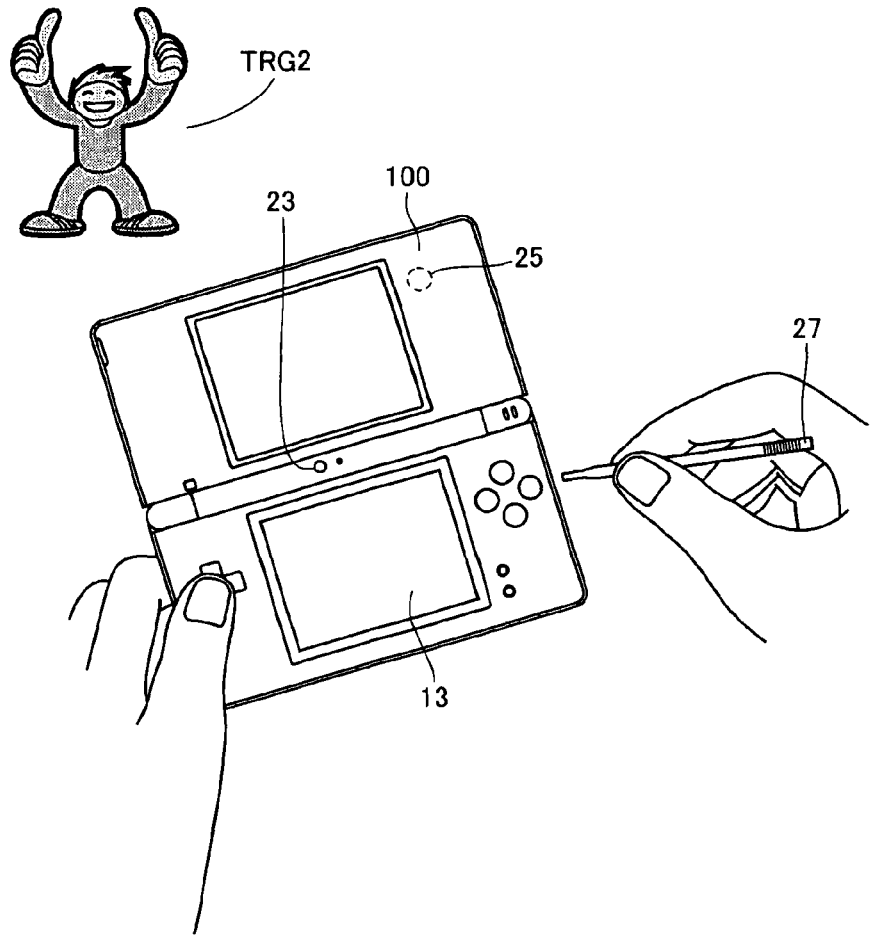
FIG. 7 is a diagram showing another example of usage of the game device according to the embodiment of the present invention.
Figure 8:
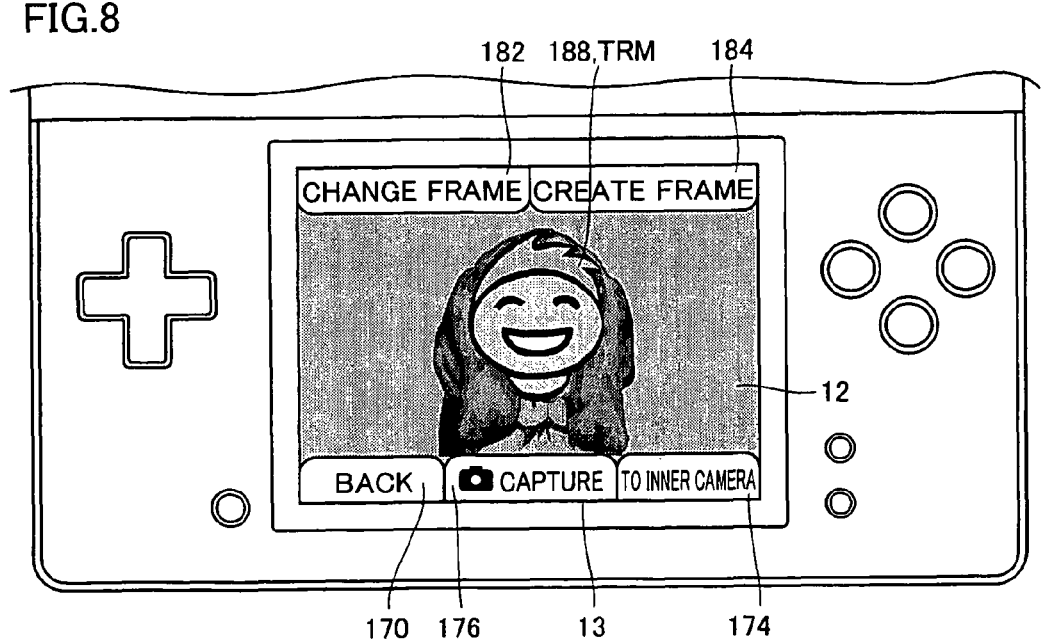
FIG. 8 is a diagram showing a screen display example using a frame image.

Specifically, the user selects in advance a frame image to be used, and then picks up an image of another subject TRG2 with the mounted camera (inner camera 23 or outer camera 25) as shown in FIG. 7. Then, as shown in FIG. 8, the frame image selected in advance is displayed in a manner superimposed on the picked up image of subject TRG2 on the display surface of lower LCD 12. Namely, the image of subject TRG2 picked up by the camera as shown in FIG. 7 is displayed in opening region TRM made by the operation as shown in FIG. 6 on lower LCD 12 shown in FIG. 8.

In other words, the selected frame image and a partial image 188 corresponding to opening region TRM set in the frame image, out of the image of subject TRG2 picked up by the camera, are displayed on lower LCD 12 shown in FIG. 8.

In addition, in the screen shown in FIG. 8, a "change frame" button 182 and a "create frame" button 184 are displayed in the upper portion of the screen. When button 182 is selected, transition to a screen for selecting a frame image to be used is made. Alternatively, when button 184 is selected, transition to a screen for generating a frame image is made.

Thus, according to image processing in the present embodiment, an image obtained by partially combining two subjects can readily be obtained. The user can thus create and enjoy an image in which a hairstyle of a person is replaced with that of another person or an image obtained by combining a person and an animal.

<Contents of Effect in "Frame Camera">

Contents of the effect in the "frame camera" according to the present embodiment will be described hereinafter with reference to FIGS. 9 and 10. As described above, in the "frame camera" according to the present embodiment, such an effect that feeling closer to actual experience in connection with the operation to scrape away the image is provided to the user is achieved. More specifically, when the user performs the operation to scrape away the image, the image in a target portion is scraped away and corresponding "shavings" are generated. The color attribute of these "shavings" reflects the color attribute of the scraped-away image. In addition, these "shavings" fall downward as in real world. Namely, the display position of the "shavings" varies over time. Moreover, a sound effect generated in scraping away is output together with generation of these "shavings".

Figure 9:
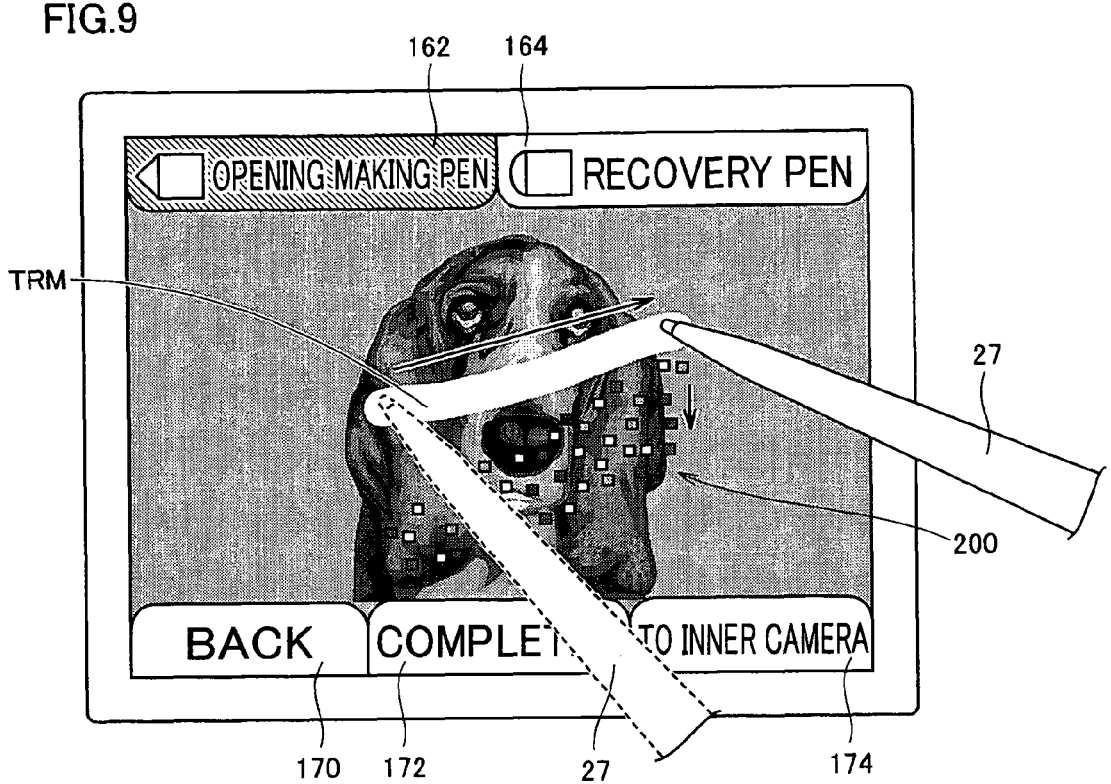
FIG. 9 is a diagram showing contents of an effect (No. 1) in a "frame camera" according to the embodiment of the present invention.

FIG. 9 shows a state that the image is scraped away through touch with touch pen 27 etc. on the screen in the "frame camera" function according to the present embodiment. As shown in FIG. 9, change target region TRM in the displayed image in accordance with a trail of touch with touch pen 27 etc. is scraped away and objects showing "shavings" corresponding to scraped-away change target region TRM are generated.

In game device 100 according to the present embodiment, such display of the object is implemented exemplarily by a particle system. The particle system refers to a system expressing a visual effect by using objects (particles) obtained by generalizing microparticles. As such a particle system is a known computer graphic technique, more detailed description thereof will not be provided. So long as expression in line with physical motion as will be described later can be achieved, any computer graphic technique other than the particle system may be employed.

The object showing "shavings" is hereinafter also referred to as the "particle". The term "particle" herein is used for meaning one unit corresponding to one "shaving" and also used for collectively denoting a plurality of units.

The display position of each of particles 200 generated in accordance with the user's operation with touch pen 27 etc. varies over time, in line with physical motion in accordance with actual gravity. Namely, the speed of each of particles 200 successively varies in accordance with prescribed acceleration (comparable to gravity) and the display position thereof is successively updated in accordance with the successively varying speed.

In addition, considering real world, in an attempt to scrape away some kind of substance with a scraper or the like, when a scraper is more quickly moved, "shavings" generated thereby scatter in a direction of movement of the scraper. Therefore, change in a manner of expressing scattering of "shavings" in accordance with a moving speed (hereinafter, also referred to as a "dragging speed") or a direction of movement of touch pen 27 etc. leads to the effect closer to actual experience.

Figure 10:
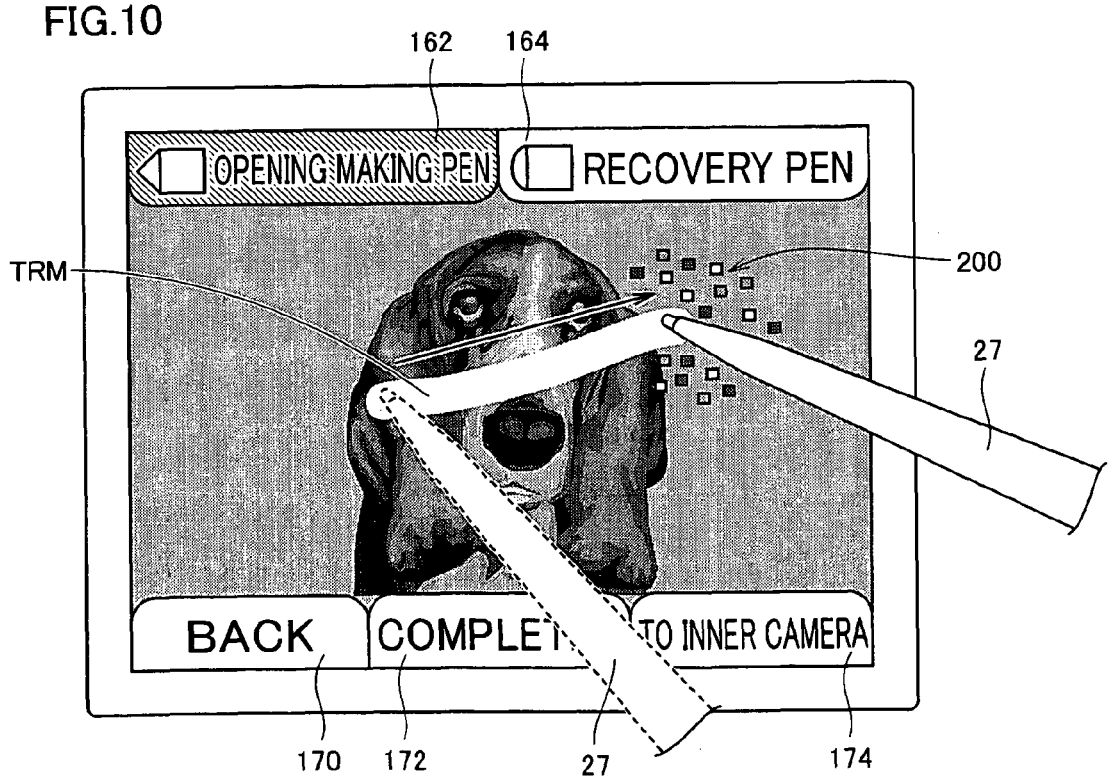
FIG. 10 is a diagram showing contents of an effect (No. 2) in the "frame camera" according to the embodiment of the present invention.
Figure 20:
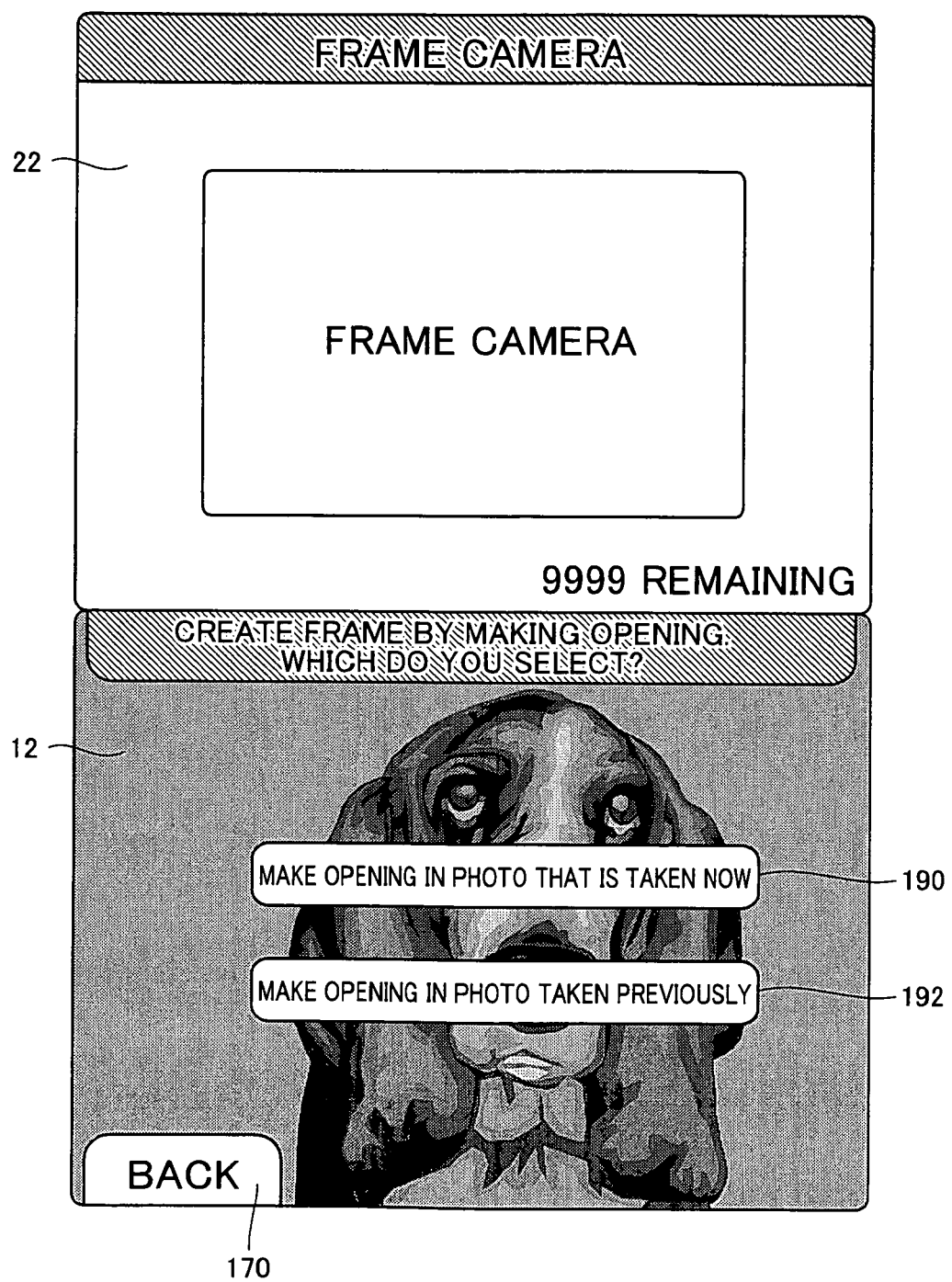
FIG. 20 is a diagram showing a screen display example (No. 3) in the game device according to the embodiment of the present invention.

Then, when the moving speed of touch pen 27 etc. is relatively high, as shown in FIG. 10, the moving state of particle 200 is displayed in a direction in accordance with the moving speed and the direction of movement of touch pen 27 etc. It can be seen based on comparison between FIGS. 9 and 10 that particles 200 shown in FIG. 9 are expressed such that they mainly fall in a downward direction in the screen, whereas particles 200 shown in FIG. 20 are expressed such that they scatter in an orientation of the direction of movement of touch pen 27 etc.

<Processing of Effect in "Frame Camera">

Processing for implementing the effect as shown in FIGS. 9 and 10 will be described hereinafter. The processing for implementing these effects generally includes (1) processing for changing the color attribute of the change target region corresponding to the input coordinate (color attribute change processing), (2) processing for generating particles corresponding to the change target region of which color attribute has been changed (particle generation processing), and (3) processing for varying over time a display position of the generated particles (particle motion processing). Contents of each processing will sequentially be described.

(1. Color Attribute Change Processing)

Figure 11A:
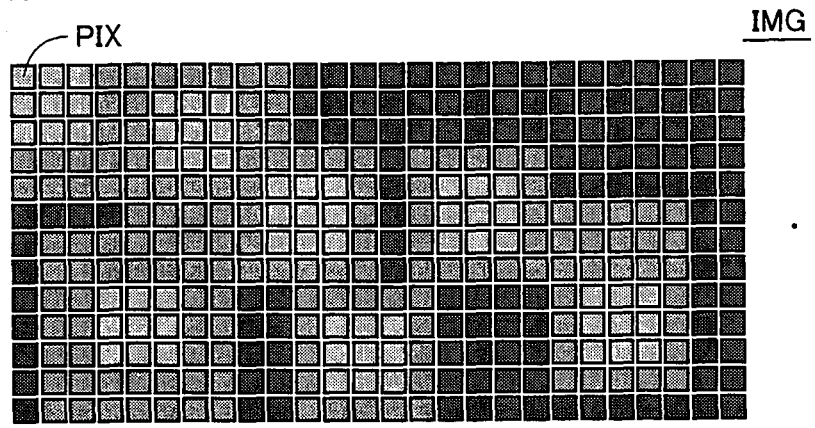
FIGS. 11A and 11B are schematic diagrams showing constitution of an image serving as a generation source of a frame image.
Figure 11B:
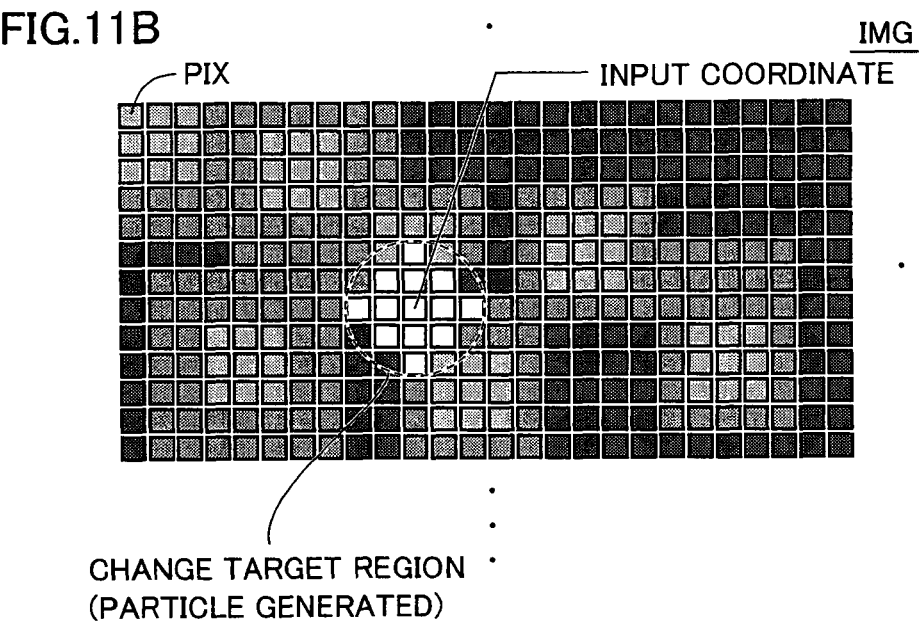

FIGS. 11A and 11B are schematic diagrams showing constitution of an image serving as a generation source of a frame image. As shown in FIG. 11A, an image IMG is constituted of a plurality of pixels PIX arranged on rows and columns. Each of pixels PIX has the color attribute.

As described above, touch panel 13 (FIG. 1) is attached to cover the screen of lower LCD 12. Namely, a detection surface of touch panel 13 and the display surface of lower LCD 12 are associated with each other. When the user touches touch panel 13 with touch pen 27 etc., the color attribute of the touched portion is changed to a value indicating that scraping away was carried out. Specifically, based on the input coordinate detected by touch panel 13, a prescribed range including that input coordinate on the image serving as the generation source is specified as the change target region of which color attribute is to be changed. Then, the color attribute of the pixel included in this change target region is changed. In the present embodiment, a circle having a prescribed radius around the input coordinate is defined as the prescribed range and specified as the change target region. If a pixel of which color attribute has already been changed is included in the circle having the prescribed radius around the input coordinate, that pixel is not specified as the change target region. In an alternative embodiment, a square or a rectangle around the input coordinate may be specified as the change target region, or only a single pixel located at the position of the input coordinate may be specified as the change target region.

In addition, in the present embodiment, the input coordinate is repeatedly detected by touch panel 13 every prescribed unit time (specifically, one frame (1/60 second)). On the other hand, if a drag operation is performed in that unit time, namely, if the input coordinate moves while touching is continued, the trail of the drag operation for that unit time, that is, a range distant by not greater than a prescribed distance from a segment from a coordinate before movement to a coordinate after movement, is defined as the prescribed range and specified as the change target region.

For example, as shown in FIG. 11B, among the pixels constituting image IMG, the region corresponding to input coordinate TP is specified as the change target region and the color attribute of the pixels included in this change target region is changed. FIG. 11B illustrates an exemplary case where a circle having a radius comparable to two pixels around input coordinate TP is specified as the change target region. As each pixel has a prescribed size, FIG. 11B shows an exemplary case where the color attribute of the pixel of which entirety is included in the change target region is changed.

Figures 12A, 12B, 13:
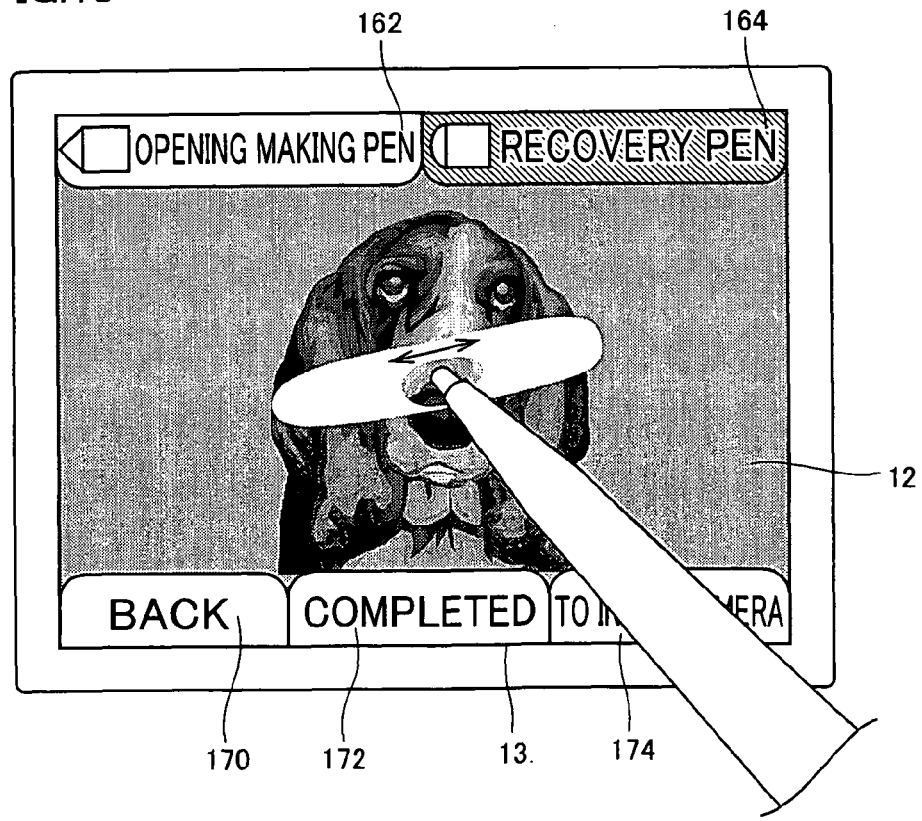
FIGS. 12A and 12B are diagrams showing an exemplary structure of image data held in the game device according to the embodiment of the present invention.
FIG. 13 is a diagram showing contents of an effect (No. 3) of the "frame camera" according to the embodiment of the present invention.

FIGS. 12A and 12B are diagrams showing an exemplary structure of image data held in game device 100 according to the embodiment of the present invention.

Referring to FIG. 12A, the color attribute of each pixel included in an image includes a "coordinate", an "A flag", an "R value", a "G value", and a "B value".

The "coordinate" is information indicating a position of a pixel within an image, and it is representatively described with a coordinate value in a direction of X-axis and a coordinate value in a direction of Y-axis different from (typically, orthogonal to) the direction of X-axis It is noted that a horizontal direction in the screen is defined as the X-axis and a vertical direction in the screen is defined as a Y direction herein.

The "R value", the "G value", and the "B value" are information expressing a color of a corresponding pixel with an RGB system. More specifically, the "R value", the "G value" and the "B value" indicate gray scale values of "red", "green" and "blue", respectively. In the description below, it is assumed that a gray scale value of each color is expressed in five bits (32 scales from 0 to 31).

The "A flag" shows whether a corresponding pixel is "effective" or "ineffective". In the present embodiment, the "A flag" shows whether a corresponding pixel is in an "effectively displayed state" or in a "scraped-away state". More specifically, when the "A flag" is set to "1", it indicates the "effectively displayed state," and when the "A flag" is set to "0", it indicates the "scraped-away state".

For example, when it is determined that a pixel at a coordinate (1, 0) is a target pixel to be scraped away, the value of the "A flag" corresponding to that pixel is changed from "1" to "0". Thus, display of the pixel at the coordinate (1, 0) becomes ineffective.

In the present embodiment, no change is made to the "R value", the "G value" and the "B value", for implementing a function to recover the scraped-away portion to the original state. Namely, as shown in FIG. 13, when "recovery pen" button 164 is selected, an instruction to recover display to the original state is issued for the region corresponding to the input coordinate. When the instruction to recover display of the scraped-away portion to the original state is issued, the value of the "A flag" of the pixel is changed from "0" to "1". As a result of this change, the image in the indicated region is displayed as in the original state.

Naturally, if it is not necessary to provide a function to recover a scraped-away portion to the original state, a scheme in which the "R value", the "G value" and the "B value" are changed to ineffective values may be adopted.

Alternatively, an alpha value indicating transparency of each pixel may be employed instead of the A flag. Here, in the "effectively displayed state," the alpha value of the corresponding pixel is set to "1" (completely opaque) and in the "scraped-away state," the alpha value of the corresponding pixel is set to "0" (transparent), so that scrape-away processing can be implemented.

The color attribute change processing as above is successively performed each time the input coordinate is detected by touch panel 13.

(2. Particle Generation Processing)

As described above, when the color attribute of the change target region in accordance with the input coordinate is changed, one or more particle is generated in correspondence with the changed change target region. More specifically, particles in number in accordance with an area of the change target region of which color attribute has been changed are generated. For example, in correspondence with respective pixels included in the change target region of which color attribute has been changed, particles equal in number to these pixels are generated. Namely, in the case of FIG. 11B, as the region corresponding to the input coordinate is specified as the change target region, the color attribute of thirteen pixels included in that change target region is converted, and in addition, thirteen particles in total are generated in correspondence with these thirteen pixels respectively. In addition, when the user performs the drag operation over touch panel 13 with touch pen 27 etc., the input coordinate varies over time. With this variation over time of the input coordinate, a plurality of particles are successively generated. Here, when the input coordinate varies over time and when a pixel of which color attribute has already been changed is included in the region newly specified as a region corresponding to the input coordinate, the pixel of which color attribute has already been converted is not specified as the change target region as described previously and particles are not generated for such pixels.

In the "frame camera" function according to the present embodiment, each particle is generated in correspondence with any pixel included in the change target region of which color attribute has been changed. Then, the color attribute of each particle is set based on the color attribute of the corresponding pixel before change. More specifically, the color in which each particle is displayed is set to a color the same as that of the corresponding pixel. In addition, though details will be described later, these particles are generated with positions of the corresponding pixels serving as their respective initial positions. Thus, such expression that a portion of an original image of which color attribute has been changed is scraped away from the original image and moved can be realized.

Figures 14A, 14B, 14C, 15:
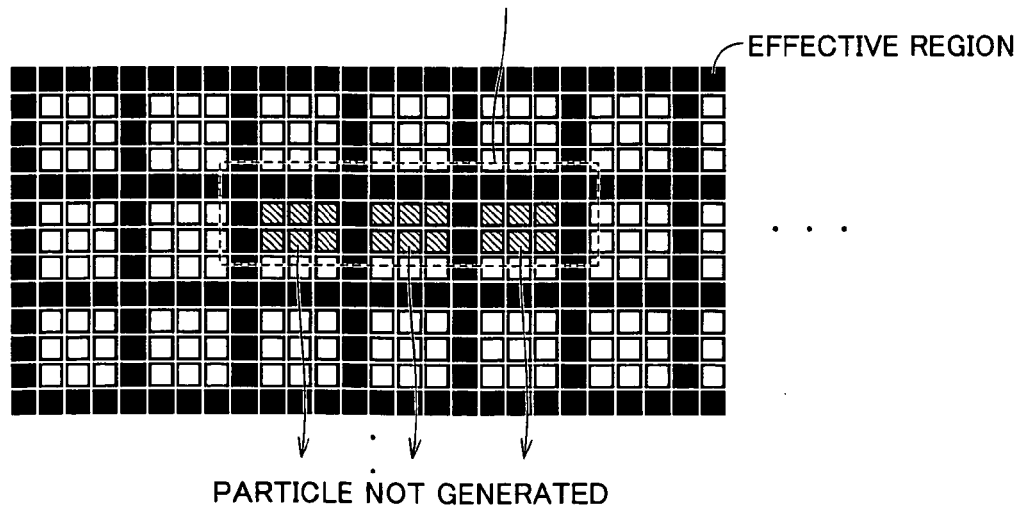
FIGS. 14A to 14C are diagrams showing an exemplary data structure of particle information generated in the game device according to the embodiment of the present invention.
FIG. 15 is a diagram showing a data structure relating to processing for thinning out particles in the game device according to the embodiment of the present invention.

FIGS. 14A to 14C are diagrams showing an exemplary data structure of particle information generated in game device 100 according to the embodiment of the present invention. FIGS. 14A to 14C show particle information generated from a pixel at the coordinate (1, 0) shown in FIG. 12.

FIG. 14A shows a state immediately after generation of the particle. Referring to FIG. 14A, the particle information includes a "current coordinate", a "current speed", "color information", and a "Dead/Alive flag".

The "current coordinate" is information indicating a display position of a corresponding particle, and it is representatively described with coordinate values in respective directions of X-axis and Y-axis. In addition, the "current speed" is information indicating a moving speed of the corresponding particle, and it is representatively described with speed components in respective directions of X-axis and Y-axis. The "current coordinate" and the "current speed" are set to initial values respectively at the time point of generation of the corresponding particle. Thereafter, the "current coordinate" and the "current speed" are successively updated with lapse of time, through (3) particle motion processing which will be described later.

The "color information" is information indicating a color of the corresponding particle, and it is representatively described with the "R value", the "G value" and the "B value" in the RGB system. For example, values the same as those for the "R value", the "G value" and the "B value" included in the color attribute of the corresponding pixel in image IMG at the time of generation of the particle are set as this "color information". Thus, each particle has the color the same as that of the corresponding pixel. It is not necessary to generate a particle having the color attribute exactly the same as that of the pixel serving as the generation source, and for example, the color attribute obtained by adding arbitrary texture to the color attribute possessed by the pixel serving as the generation source may be provided to each particle.

The "Dead/Alive flag" indicates whether display of the corresponding particle is "effective" or "ineffective". This "Dead/Alive flag" is used, for example, for a case where display of each particle is erased from the screen after it "fell" down to the lowermost portion of the screen. Namely, the "Dead/Alive flag" is changed from "1" to "0" in such a case as erasing the particle after the "current coordinate" of that particle is varied over time.

Here, such an effect that the scraped-away particles are heaped in the lower portion of the screen may be achieved, and in such a case, the "Dead/Alive flag" is maintained at "1".

As described previously, when the drag operation is performed in the present embodiment, the change target region of which color attribute is to be converted is set in accordance with the trail of the drag operation in a unit time, however, when the dragging speed is high, an area of the region of which color attribute is to be changed per a unit time increases. Here, if a particle is to be generated for each pixel included in that region, the number of particles generated per a unit time also increases. Consequently, a quantity of image processing for expressing each particle in line with physical motion may exceed the limit of hardware performance.

Then, when it is expected that particles generated per a unit time are excessive, the number of generated particles is preferably thinned out. Namely, in the "frame camera" function according to the present embodiment, a ratio of generation of particles to the area of the change target region of which color attribute has been changed is lowered when the dragging speed is high.

In other words, when the dragging speed is lower than a prescribed threshold value, one particle is generated for one pixel of which color attribute has been changed. When the dragging speed is greater than the prescribed threshold value, particles are not generated for some pixels among a plurality of pixels of which color attribute has been changed.

Thus, in the "frame camera" function according to the present embodiment, processing for thinning out generated particles in accordance with magnitude of the dragging speed is performed. Exemplary processing for implementing such processing for thinning out the particles will be described with reference to FIG. 15.

FIG. 15 is a diagram showing a data structure relating to processing for thinning out particles in game device 100 according to the embodiment of the present invention. FIG. 15 corresponds to the structure of the image data shown in FIG. 12.

Referring to FIG. 15, an effective region (solidly shaded portion in FIG. 15) is set in advance for the image data. This effective region is set like a grid, with a space formed from a prescribed number of pixels being interposed in a direction of row and in a direction of column. Then, in performing the processing for thinning out the particles, particles are generated only for this grid-like region. Namely, even though the color attribute of a pixel (hatched portion in FIG. 15) not included in this effective region is changed in accordance with the user's input operation, a particle is not generated for that pixel.

On the other hand, in normal processing, a particle is generated in correspondence with each of all pixels of which color attribute has been changed.

Thus, by selecting a region for which a particle is to be generated in accordance with magnitude of the dragging speed, a ratio of generation of particles to the area of the change target region of which color attribute has been changed is lowered. By adopting such a method, it is not necessary to use a complicated function or the like for lowering the ratio of generation of particles, and a quantity of operation can be decreased.

(3. Particle Motion Processing)

As described above, in the "frame camera" function according to the present embodiment, the effect for display is different depending on magnitude of the dragging speed. Processing for achieving each effect will be described hereinafter.

(3-1. Example where Dragging Speed is Relatively Low (First Mode))

When the dragging speed is relatively low (first mode), expression is such that particles mainly fall downward in the screen (or in a downward direction of gravity). Motion of each particle, that is, variation over time of the display position, is set based on a parameter of the "current speed" shown in FIGS. 14A to 14C. Therefore, the "current speed" of each particle is set to the initial value as appropriate and successively updated in line with actual physical motion.

In the first mode, initial velocity immediately after generation of the particle is set independently of the dragging speed. Specifically, the direction of X-axis of each particle is set to zero and the initial value of the speed component in the direction of Y-axis is randomly set. In addition, it is assumed here that each particle carries out uniform motion in the direction of X-axis and it is affected by acceleration comparable to gravity in the direction of Y-axis. Speed components Vx and Vy in the directions of X-axis and Y-axis for each particle are expressed with a function with respect to time t, as follows. Here, the timing of generation of each particle is denoted as time t=0, and the direction of Y-axis is positive in a downward direction in the screen.

$$Vx(0)=0 \tag{1.1}$$

$$Vx(t+\Delta t)=Vx(t)=Vx(0) \tag{1.2}$$

$$Vy(0)=\mathrm{rand}(a1{:}b1) \tag{2.1}$$

$$Vy(t+\Delta t)=Vy(t)+g\times\Delta t \tag{2.2}$$

where rand(a:b) represents a function generating a random number in a section [a:b], $\Delta t$ represents an operation cycle (or a frame cycle), and g represents acceleration comparable to gravity.

Section [a1:b1] in the (2.1) equation preferably covers a range from a positive side to a negative side including zero. Though a value of speed component Vy in the direction of Y-axis increases as a result of acceleration g with lapse of time, speed component Vy may be limited to a certain upper limit value.

In addition, coordinates X1 and Y1 in the directions of X-axis and Y-axis of each particle are expressed with a function with respect to time t, as follows.

$$X1(0)=(X\text{ coordinate value of corresponding pixel}) \tag{3.1}$$

$$X1(t+\Delta t)=X1(t)+Vx(t)\times\Delta t \tag{3.2}$$

$$Y1(0)=(Y\text{ coordinate value of corresponding pixel}) \tag{4.1}$$

$$Y1(t+\Delta t)=Y1(t)+Vy(t)\times\Delta t \tag{4.2}$$

(3-2. Example where Dragging Speed is Relatively High (Second Mode))

When the dragging speed is relatively high (second mode), the particle is expressed such that it scatters in an orientation of the direction of movement of touch pen 27 etc.

In the second mode, initial velocity immediately after generation of the particle is set depending on the dragging speed. Specifically, the initial value of the speed component in the direction of X-axis of each particle is set based on a speed component Mx in the direction of X-axis of the dragging speed immediately before and a random value. Similarly, the initial value of the speed component in the direction of Y-axis of each particle is set based on a speed component My in the direction of Y-axis of the dragging speed immediately before and a random value. In addition, as in the first mode described above, it is assumed here that each particle carries out uniform motion in the direction of X-axis and it is affected by acceleration comparable to gravity in the direction of Y-axis.

Speed components Vx and Vy in the direction of X-axis and the direction of Y-axis of each particle are expressed with a function with respect to time t, as follows. Here, the timing of generation of each particle is denoted as time t=0, and the direction of Y-axis is positive in a downward direction in the screen.

$$Vx(0)=Mx\times\mathrm{rand}(a2{:}b2) \tag{5.1}$$

$$Vx(t+\Delta t)=Vx(t)=Vx(0) \tag{5.2}$$

$$Vy(0)=Mx\times\mathrm{rand}(a3{:}b3) \tag{6.1}$$

$$Vy(t+\times t)=Vy(t)+g\times\Delta t \tag{6.2}$$

where rand(a:b) represents a function generating a random number in section [a:b], $\Delta t$ represents an operation cycle (or a frame cycle), and g represents acceleration comparable to gravity.

Preferably, a section [a2:b2] in the (5.1) equation and a section [a3:b3] in the (6.1) equation are both maintained in a positive range. Thus, such unnatural movement of the particle as flying in a direction opposite to the drag direction can be avoided. Though a value of speed component Vy in the direction of Y-axis increases as a result of acceleration g with lapse of time, speed component Vy may be limited to a certain upper limit value.

As the function of coordinates X1 and Y1 in the direction of X-axis and the direction of Y-axis for each particle is the same as the (3.1) equation to the (4.2) equation described above, detailed description will not be repeated.

Alternatively, in setting initial velocity immediately after generation of the particle in accordance with the direction of movement (hereinafter, also referred to as the "drag direction") of touch pen 27 etc., the initial velocity should be set so as to maintain relative relation between speed component Mx in the direction of X-axis of the dragging speed and speed component My in the direction of Y-axis thereof. More specifically, (7.1) equation shown below is preferably used instead of the (6.1) equation above.

$$Vx(0)=Mx \times \text{rand}(a2:b2) \quad (5.1)$$

$$Vy(0)=My \times \text{rand}(a2:b2) \quad (7.1)$$

By using the (5.1) equation and the (7.1) equation above, the direction of an initial velocity vector immediately after generation of the particle coincides with a direction of a speed vector of the dragging speed. Namely, the particle immediately after generation starts moving along the drag direction immediately before.

As the function of coordinates X1 and Y1 in the direction of X-axis and the direction of Y-axis for each particle is the same as the (3.1) equation to the (4.2) equation described above, detailed description will not be repeated.

(3-3. Rendering Processing)

By successively generating an internal rendering command in accordance with the successively updated current coordinate, the particle is displayed such that it moves over the screen. Namely, by successively generating the rendering command with the update of the current coordinate, a particle is rendered in an animated manner. Details of rendering processing of the particle will be described later.

(Update Example of Current Speed and Current Coordinate)

Exemplary variation over time of the current coordinate and the current speed based on each equation described above will be described with reference again to FIGS. 14A to 14C. As described above, FIG. 14A shows a state immediately after generation of the particle, FIG. 14B shows a state in an operation cycle subsequent to FIG. 14A, and FIG. 14C shows a state in which the particle has been erased after the display position of the particle varied to the lowermost portion of the screen.

For example, FIG. 14A shows a case where the initial value of the speed component in the direction of X-axis is set to "0" and the initial value of the speed component in the direction of Y-axis is set to "1.0".

Referring to FIG. 14B, under the influence of acceleration comparable to gravity, speed component Vy in the direction of Y-axis varies over time. Namely, it can be seen that speed component Vy in the direction of Y-axis varies from "1.0" to "3.0". On the other hand, speed component Vx in the direction of X-axis is maintained at a constant value.

In addition, the current coordinate is updated from (1, 0) to (1, 1) in accordance with speed components Vx and Vy in the direction of X-axis and the direction of Y-axis.

When speed components Vx and Vy and the current coordinate are thus successively updated and the display position reaches the lowermost portion of the screen, the state as shown in FIG. 14C is achieved.

Referring to FIG. 14C, when the scraped-away particle falls down to the lower portion of the screen, the value of the Dead/Alive flag is set to "0" in order to erase display of that particle.

If such an effect that the scraped-away particles are heaped in the lower portion of the screen is to be achieved, the value of the Dead/Alive flag is maintained at "1" and speed components Vx and Vy are both set to "0".

(Variation)

Each equation described above is based on such usage that upper LCD 22 and lower LCD 12 are arranged vertically when viewed from the user as shown in FIG. 3. In game device 100 according to the present embodiment, however, such usage that upper LCD 22 and lower LCD 12 are horizontally arranged when viewed from the user is also applicable. In such a case, a direction sensor or the like may be mounted on game device 100 to specify a downward direction of gravity of actual game device 100, so that acceleration in accordance with that direction is applied.

(4. Sound Effect Processing)

When the color attribute of the change target region in accordance with the input coordinate is changed, sound effect in accordance with the changed change target region is output from the speaker or the like. In game device 100 according to the present embodiment, sound effect in accordance with the area of the change target region of which color attribute has been changed is selectively output.

With regard to a more specific configuration, in game device 100 according to the present embodiment, which step value among a plurality of predetermined step values (for example, first to fifth steps) in accordance with the number of pixels included in the change target region of which color attribute has been changed is applicable is determined, and a sound in accordance with the determined step value is output.

As an example of setting of such a step value, if the change target region of which color attribute has been changed includes only a single pixel, determination as the first step is made. On the other hand, the change target region of which color attribute has been changed includes a plurality of pixels, determination as any of the second step to the fifth step is made. Specifically, as the number of pixels included in the change target region increases, a greater step value from the second step toward the fifth step is set.

In addition, a plurality of types of sound data are prepared in advance. For example, one piece of sound data for outputting sound effect used in the first step and a plurality of pieces (for example, four pieces) of sound data for outputting sound effect used in the second to fifth steps are stored in advance. Then, one piece or a plurality of pieces of sound data is (are) reproduced in accordance with a determined step value.

Specifically, when determination as the first step is made, sound data associated with the first step is reproduced, and when determination as any of the second step to the fifth step is made, sound data piece(s) in number corresponding to the step value out of sound data associated with the second step to the fifth step is (are) substantially simultaneously reproduced. Namely, assuming that the step values are defined as the second step to the fifth step in ascending order of the number of pixels, when determination as the second step is made, one piece of sound data corresponding to a first pattern out of sound data associated with the second step to the fifth step is reproduced. Alternatively, when determination as the third step is made, two pieces of sound data corresponding to the first pattern and a second pattern out of the sound data associated with the second step to the fifth step are simultaneously reproduced. Similarly, the number of pieces of reproduced sound data is increased in accordance with the determined step value.

Thus, by adding types of sound to be simultaneously reproduced as the number of pixels included in the change target region increases, the volume for reproduction becomes greater and a greater number of tones is included in the sound effect. Therefore, the user can obtain such feeling that the sound is close to sound generated in actual scraping-away operation. In addition, even when only one pixel is included in the change target region of which color attribute has been changed, sound effect is reliably output. Therefore, even when such an operation as scraping away a small region, the user can recognize that such an operation is reliably performed.

In addition to the processing for outputting sound effect as described above, the following method may be adopted.

Instead of such a configuration that sound effect is selectively output in accordance with the number of pixels included in the change target region of which color attribute has been changed within one operation cycle (or a frame cycle), sound effect may selectively be output in accordance with the number of pixels included in the change target region of which color attribute has been changed within a prescribed period of time (within a plurality of operation cycles).

Alternatively, instead of such a configuration that sound effect is selectively output in accordance with the number (area) of pixels included in the change target region of which color attribute has been changed, sound effect may selectively be output in accordance with a quantity of variation of the input coordinate.

Alternatively, instead of such a configuration that sound effect is selectively output in accordance with the number (area) of pixels included in the change target region of which color attribute has been changed, sound effect may selectively be output in accordance with the number of generated particles (objects).

Alternatively, instead of the configuration that the number of simultaneously reproduced sound data pieces is changed, such a configuration that a type of sound data to be reproduced is changed may be adopted as a method of changing sound effect.

Alternatively, as a method of changing sound effect, the volume in reproducing sound data may be changed.

Alternatively, instead of such processing as making switching at discrete step values, (volume of) sound effect may continuously be changed in accordance with the number (area) of pixels included in the change target region of which color attribute has been changed or a quantity of variation of the input coordinate.

<Control Structure>

Figure 16:
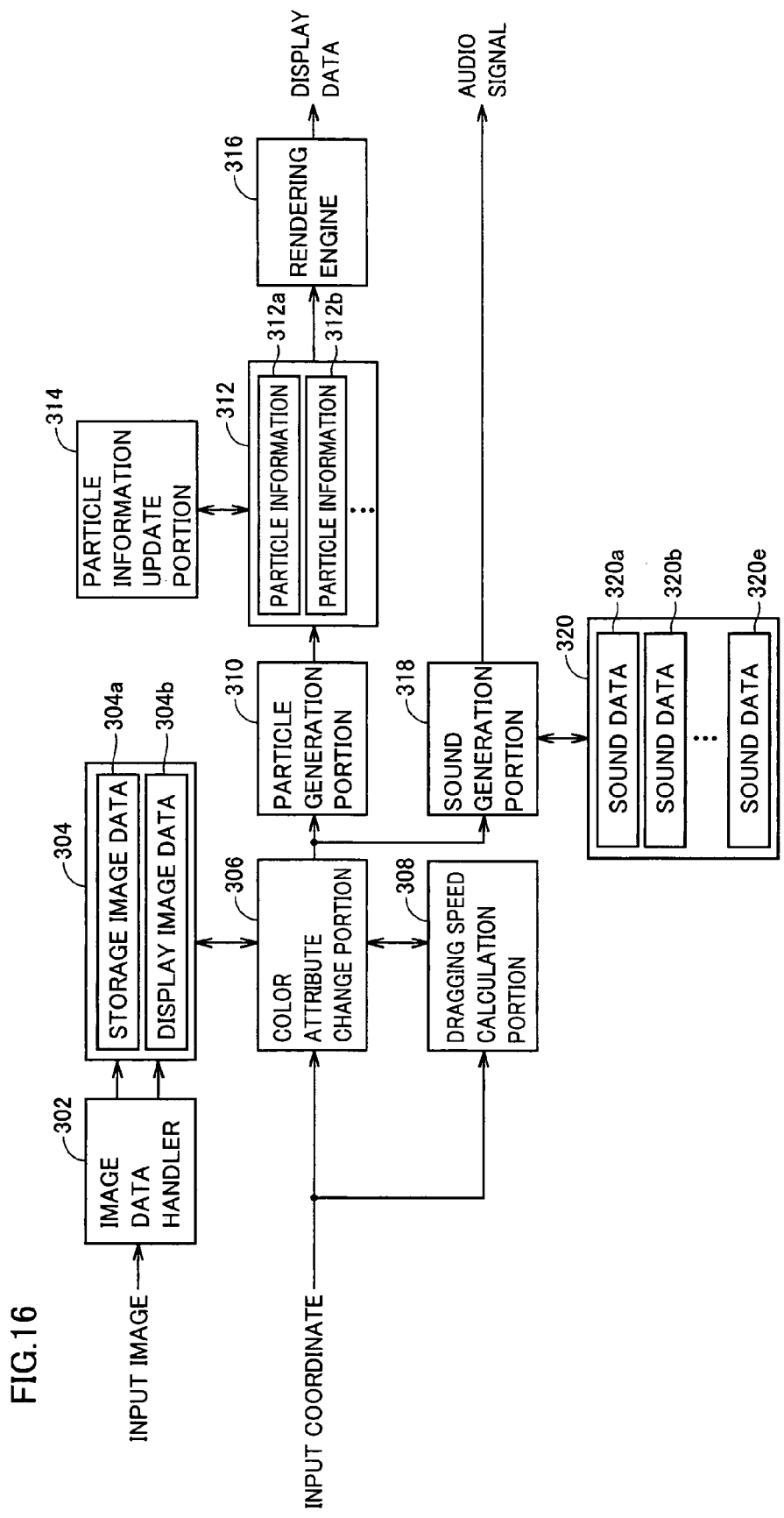
FIG. 16 is a schematic diagram showing a substantial part of a control structure of the game device according to the embodiment of the present invention.

FIG. 16 is a schematic diagram showing a substantial part of a control structure of game device 100 according to the embodiment of the present invention. The control structure shown in FIG. 16 is typically provided by execution of a program stored in memory card 29 or the like by CPU 31. It is noted that functions shown in FIG. 16 may partially or entirely be attained by hardware.

Referring to FIG. 16, game device 100 includes, as the control structure thereof, an image data handler 302, an image data memory 304, a color attribute conversion portion 206, a dragging speed calculation portion 308, a particle generation portion 310, a particle information memory 312, a particle information update portion 314, a rendering engine 316, a sound generation portion 318, and a sound data memory 320.

Image data handler 302 accepts an input image designated through the user's operation and outputs the input image to image data memory 304.

In storing a frame image that has been subjected to the edition operation in memory card 28 (FIG. 2) or the like, image data including a greater number of pixels is preferably used, in order to provide image data of higher quality. On the other hand, in order to achieve crisp screen display, pixels included in one piece of image data are preferably suppressed to an extent corresponding to resolution of the display portion (LCD). Accordingly, in game device 100 according to the present embodiment, two pieces of image data, that is, image data for storage (storage image data) for storage in memory card 28 or the like and image data for screen display (display image data), are held on main memory 32 based on identical input image data and subjected to processing such as color attribute conversion or the like. For example, it is assumed that a size of storage image data is as large as a size of the input image data (for example, 640×480 dots) and a size of display image data is smaller than that of the input image data (for example, 256×192 dots).

When image data handler 302 accepts the input image data, image data handler 302 outputs the input image data as it is to image data memory 304 as the storage image data, and generates display image data of which size has been reduced and outputs that data to image data memory 304. Image data memory 304 includes an area 304a storing the storage image data and an area 304b storing the display image data.

Color attribute conversion portion 306 successively changes the color attribute of a corresponding pixel of the storage image data and the display image data in response to the input coordinate detected in accordance with the user's touch operation with touch pen 27 etc. Therefore, the color attribute of each corresponding region of the storage image data and the display image data is changed.

In addition, color attribute conversion portion 306 outputs information on the pixel of which color attribute has been changed among pixels included in the display image data to particle generation portion 310. Here, color attribute conversion portion 306 selects any of the first mode in which a particle is generated for each pixel and the second mode in which a particle is generated with pixels being thinned out, based on the dragging speed calculated by dragging speed calculation portion 308 which will be described later, and outputs information on the necessary pixel to particle generation portion 310 in accordance with the selected mode.

Particle generation portion 310 generates the necessary number of pieces of particle information, based on the information on the pixel from color attribute conversion portion 306. Then, particle generation portion 310 causes particle information memory 312 to store the particle information.

Particle information update portion 314 successively updates each piece of particle information stored in particle information memory 312 for each operation cycle.

Rendering engine 316 successively generates a rendering command for having the necessary number of particles displayed based on the particle information stored in particle information memory 312, for output as the display data.

Sound generation portion 318 determines a step value of the sound effect to be output, based on the information on the pixel from color attribute conversion portion 306. Then, sound generation portion 318 reproduces sound data pieces in number in accordance with the determined step value, out of sound data stored in sound data memory 320. An audio signal generated as a result of reproduction of sound data by this sound generation portion 318 is output through I/F circuit 42 to amplifier 44. Then, the sound effect is output from the speaker.

Sound data memory 320 stores a plurality of types of sound data 320a to 320e. Then, sound data memory 320 transfers necessary sound data to sound generation portion 318, in response to access from sound generation portion 318.

<Rendering Processing>

As described above, in game device 100 according to the present embodiment, the color attribute of the change target region corresponding to the input coordinate is changed and particles are generated in accordance with the change target region of which color attribute has been changed. In addition, the display position of the particle is successively updated over time. Rendering processing for achieving such image display will be described with reference to FIG. 17.

Figure 17:
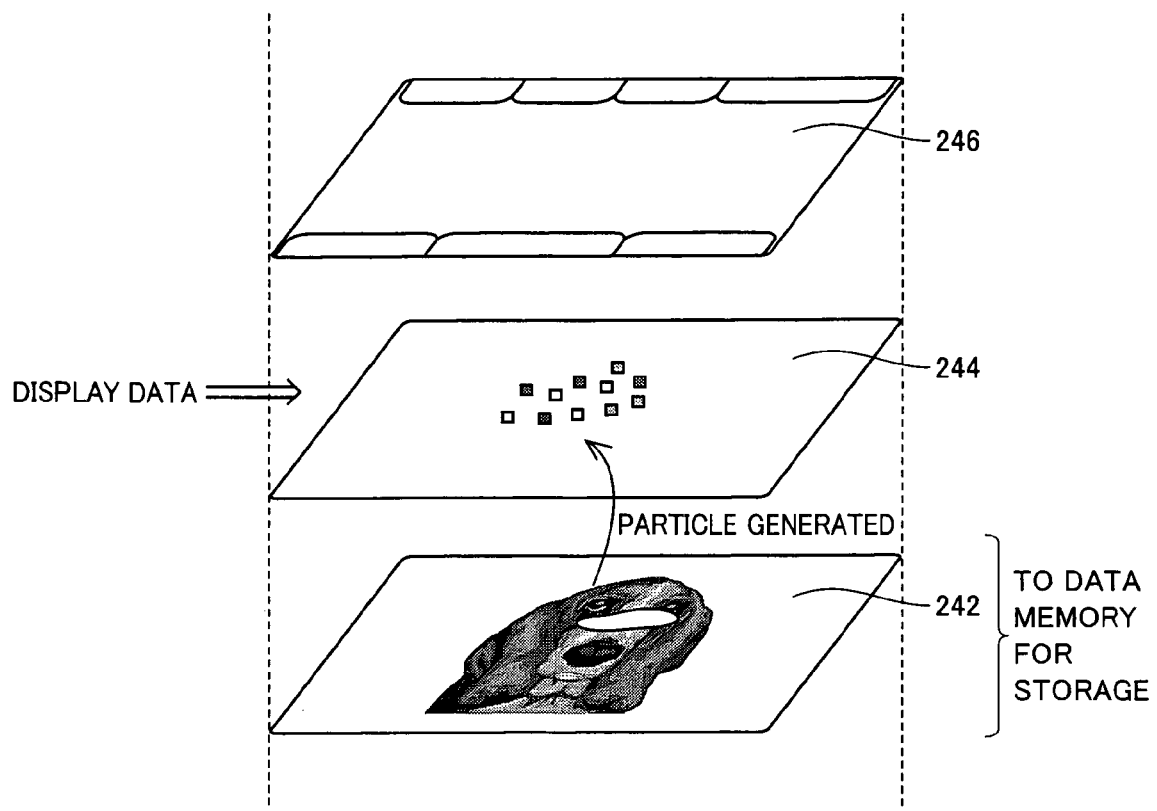
FIG. 17 is a schematic diagram for illustrating rendering processing of the game device according to the embodiment of the present invention.

FIG. 17 is a schematic diagram for illustrating rendering processing for game device 100 according to the embodiment of the present invention. Referring to FIG. 17, in game device 100 according to the present embodiment, three layers 242, 244 and 246 are used to generate a video image signal for display on the screen. It is noted that each of layers 242, 244 and 246 is implemented by forming a memory area having a capacity comparable to resolution of at least lower LCD 12 in main memory 32.

A first layer 242 is a memory area for displaying a frame image (display image data) to be edited. The display image data generated by image data handler 302 (FIG. 16) is developed in this first layer 242. In addition, the pixel determined as "ineffective" as a result of change of the color attribute of the display image data is handled as ineffective also in this first layer 242. More specifically, the pixel determined as ineffective is regarded as a transparent pixel.

A second layer 244 is a memory area for dynamically displaying particles. The display data output from rendering engine 316 is developed on second layer 244. Each time this display data is updated, contents on second layer 244 are rewritten and finally, particles are displayed such that they are carrying out physical motion.

A third layer 246 is a memory area for displaying a button for accepting the user's operation. CPU 31 writes data for displaying a necessary button in an area corresponding to third layer 246, in accordance with a function or an operation mode selected by the user's operation.

An image obtained by combining data stored in these layers 242, 244 and 246 is displayed on lower LCD 12. In each of layers 242, 244 and 246, only a pixel of which data to be displayed exists is handled as effective, and a pixel of which data to be displayed does not exist is handled as transparent, so to speak. Therefore, regarding the pixel handled as transparent in a certain layer, data of a corresponding pixel in a lower layer is displayed on the screen. Though not shown, a background layer is present below first layer 242 and a Live image or the like is displayed by using this layer. Thus, for the pixel determined as "ineffective" in first layer 242, a Live image is displayed on the LCD.

<Screen Transition Example>

Exemplary screen transition in game device 100 according to the present embodiment will be described hereinafter with reference to FIGS. 18 to 24.

Figure 18:
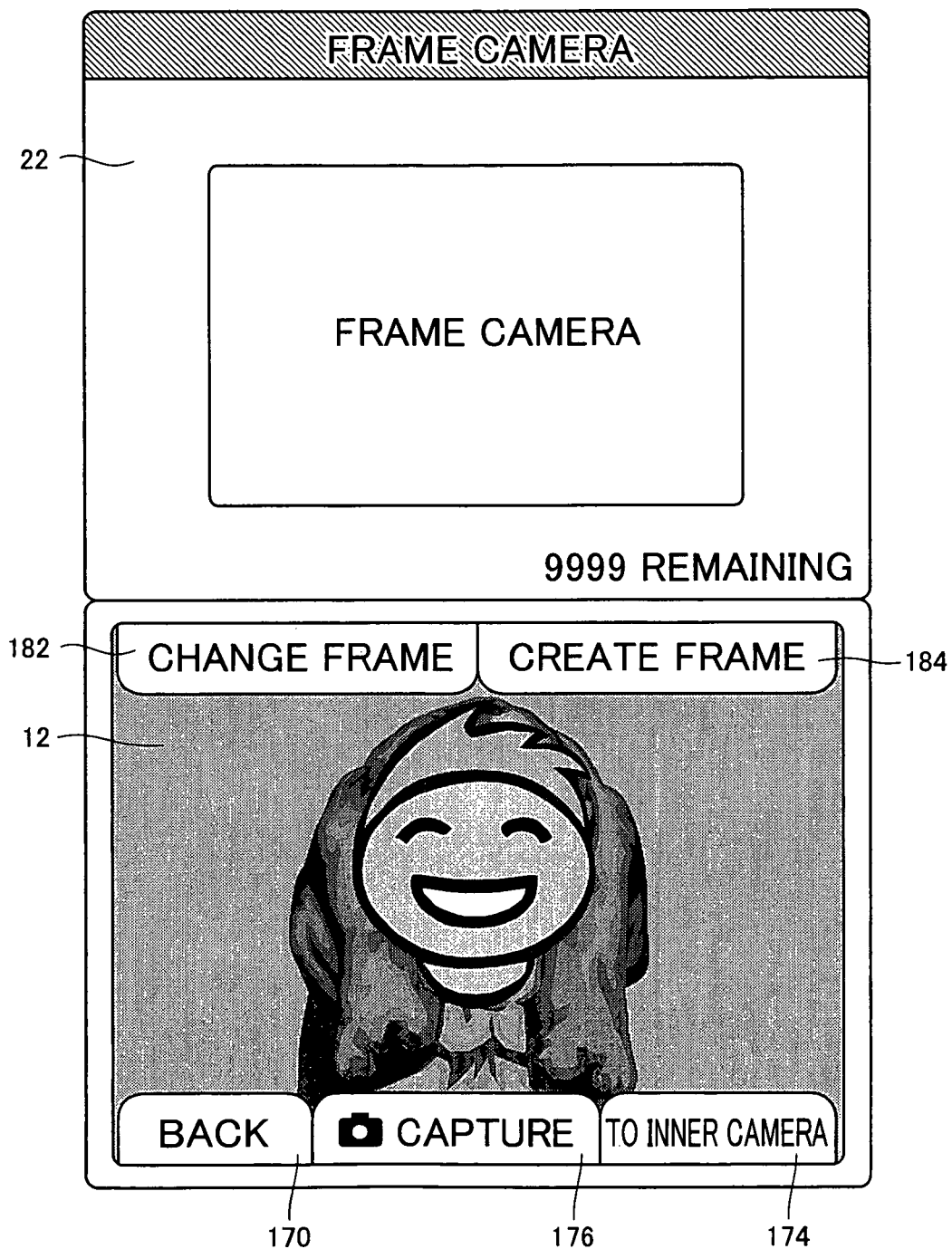
FIG. 18 is a diagram showing a screen display example (No. 1) in the game device according to the embodiment of the present invention.

When the "frame camera" function is selected in the selection screen shown in FIG. 4, transition to a screen as shown in FIG. 18 is made.

Referring to FIG. 18, upper LCD 22 displays a message that the "frame camera" function has been selected. On the other hand, lower LCD 12 displays an image obtained by superimposing the frame image created in advance on the image picked up by the camera (inner camera 23 or outer camera 25). In the initial state, the frame image selected at the time of end of the previous function is selected as default. Alternatively, an initially registered frame image or a most recently registered frame image may be selected as default.

On lower LCD 12, "change frame" button 182 and "create frame" button 184 are displayed in the upper portion of the screen. When button 182 is selected, transition to a screen shown in FIG. 19 which will be described later is made. Alternatively, when button 184 is selected, transition to a screen shown in FIG. 20 which will be described later is made.

Figure 19:
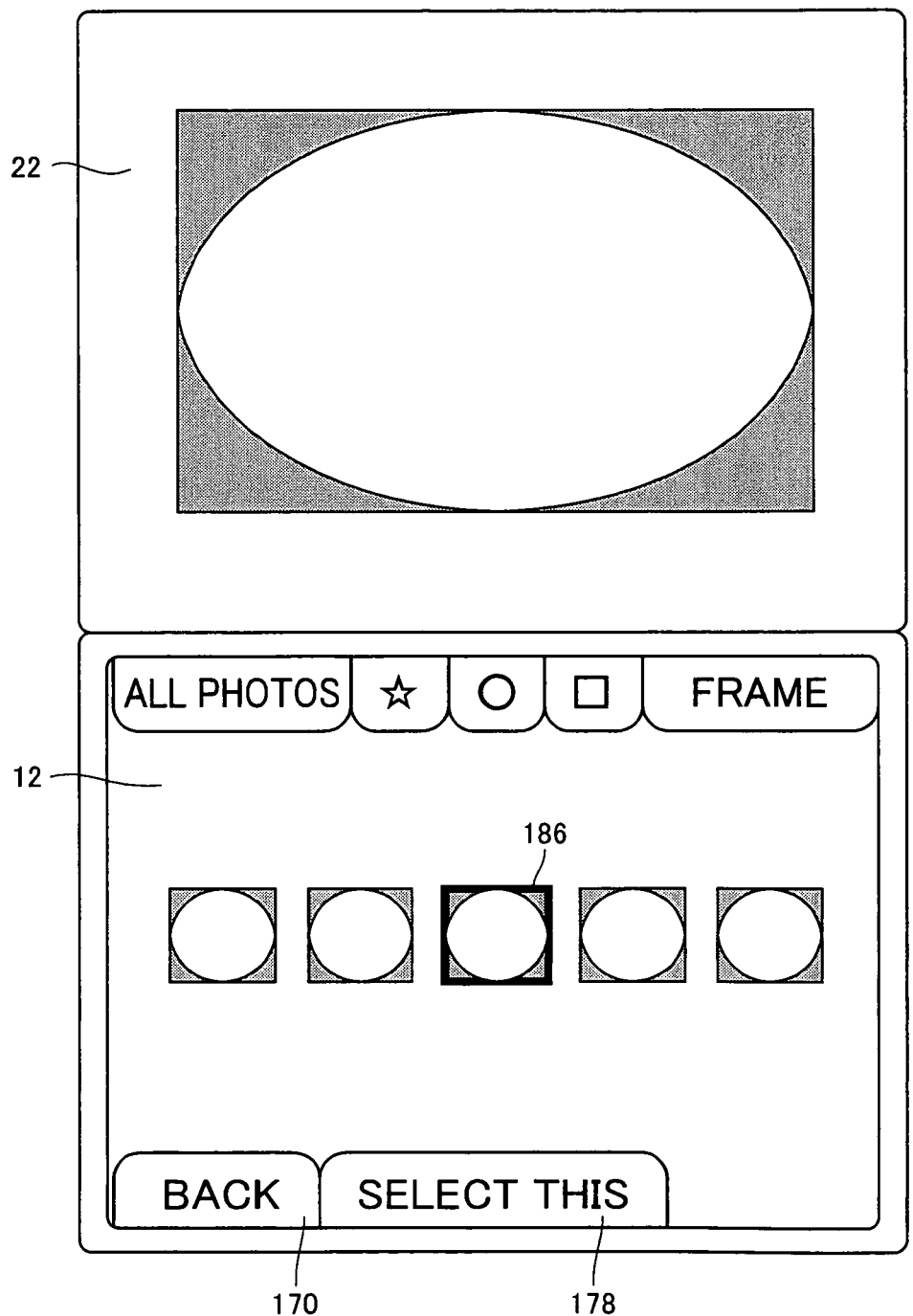
FIG. 19 is a diagram showing a screen display example (No. 2) in the game device according to the embodiment of the present invention.

In the screen shown in FIG. 19, selection of a frame image is permitted. Lower LCD 12 displays a list of thumbnail images of the frame images that have already been created and a cursor 186 for designating these thumbnail images. In addition, upper LCD 22 displays the image of the frame image designated with this cursor 186. Moreover, on lower LCD 12, "back" button 170 and a "select this" button 178 are displayed in the lower portion of the screen. When button 170 is selected, selection of the frame image is discarded and the screen returns to the screen shown in FIG. 18. On the other hand, when button 178 is selected, the frame image designated with cursor 186 is selected and the screen returns to the screen shown in FIG. 18.

In the screen shown in FIG. 20, generation of a new frame image is permitted. Upper LCD 22 displays a message indicating that the "frame camera" function has been selected. On the other hand, lower LCD 12 displays a message "Create frame by making opening. Which do you select?" in the upper portion of the screen. In addition, lower LCD 12 displays a "make opening in photo that is taken now" button 190 and a "make opening in photo taken previously" button 192 in the central portion of the screen. When button 190 is selected, transition to a screen shown in FIG. 21 which will be described later is made. Alternatively, when button 192 is selected, transition to a screen shown in FIG. 22 which will be described later is made. In addition, lower LCD 12 displays "back" button 170 in the lower left portion of the screen. When button 170 is selected, the screen returns to the screen shown in FIG. 18.

Figure 21:
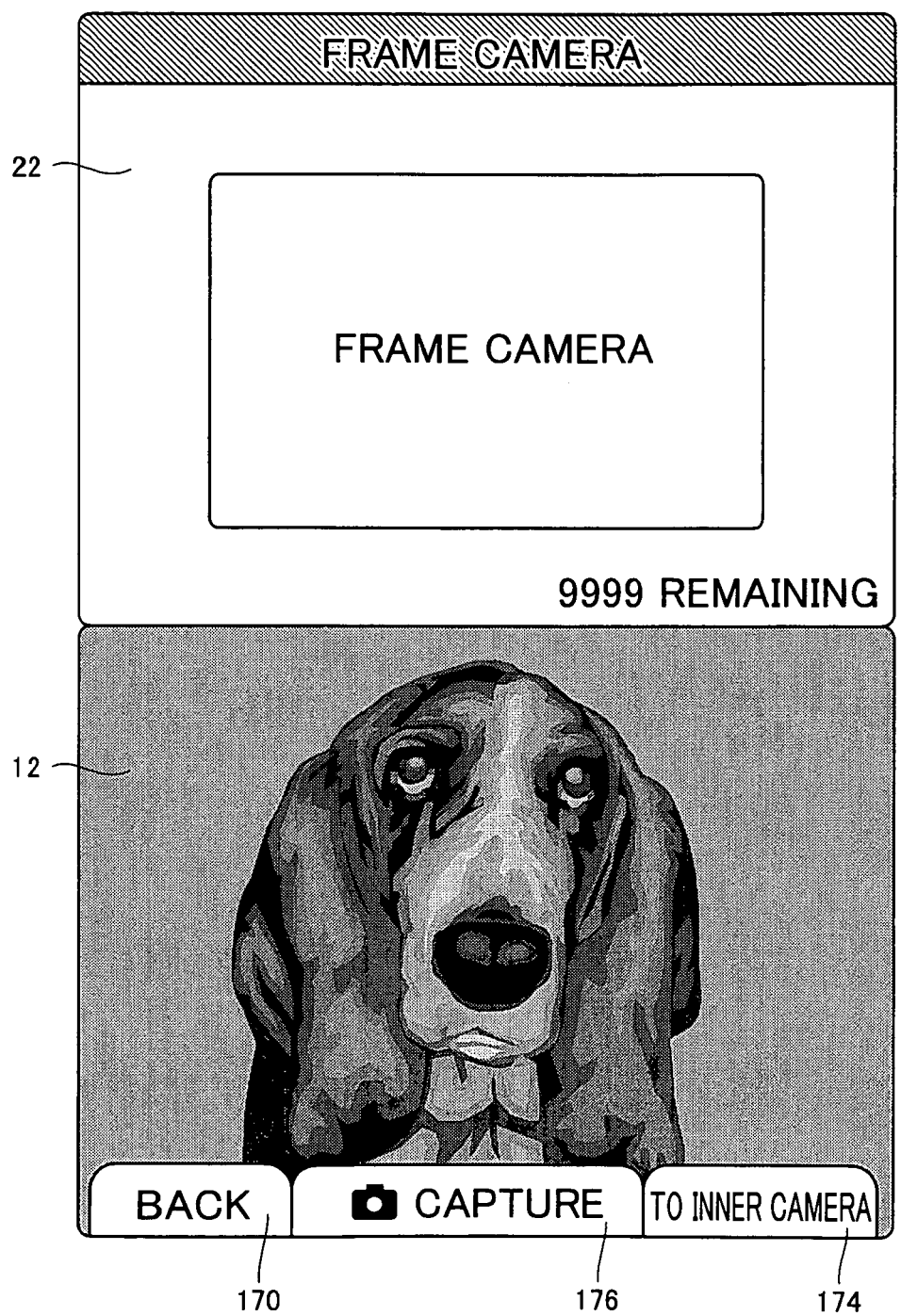
FIG. 21 is a diagram showing a screen display example (No. 4) in the game device according to the embodiment of the present invention.

In the screen shown in FIG. 21, generation of a frame image by using the image picked up by the camera (inner camera 23 or outer camera 25) is permitted. Upper LCD 22 displays a message that the "frame camera" function has been selected. On the other hand, lower LCD 12 displays in real time the image picked up by the camera (inner camera 23 or outer camera 25). In addition, lower LCD 12 displays "back" button 170, a "capture" button 176 and switch button 174 in the lower portion of the screen.

When button 176 is selected, the image picked up by the camera at the selected timing is temporarily stored as a still image in main memory 32 (FIG. 2) or the like. Then, transition to a screen shown in FIG. 23 which will be described later is made. Alternatively, when switch button 174 is selected, the camera to be used for image pick-up is switched between inner camera 23 and outer camera 25. It is noted that an indication urging the user to select a camera that is not currently selected is provided on switch button 174. Namely, when outer camera 25 has been selected, a message "to inner camera" is displayed. Alternatively, when button 170 is selected, the screen returns to the screen shown in FIG. 18.

Figure 22:
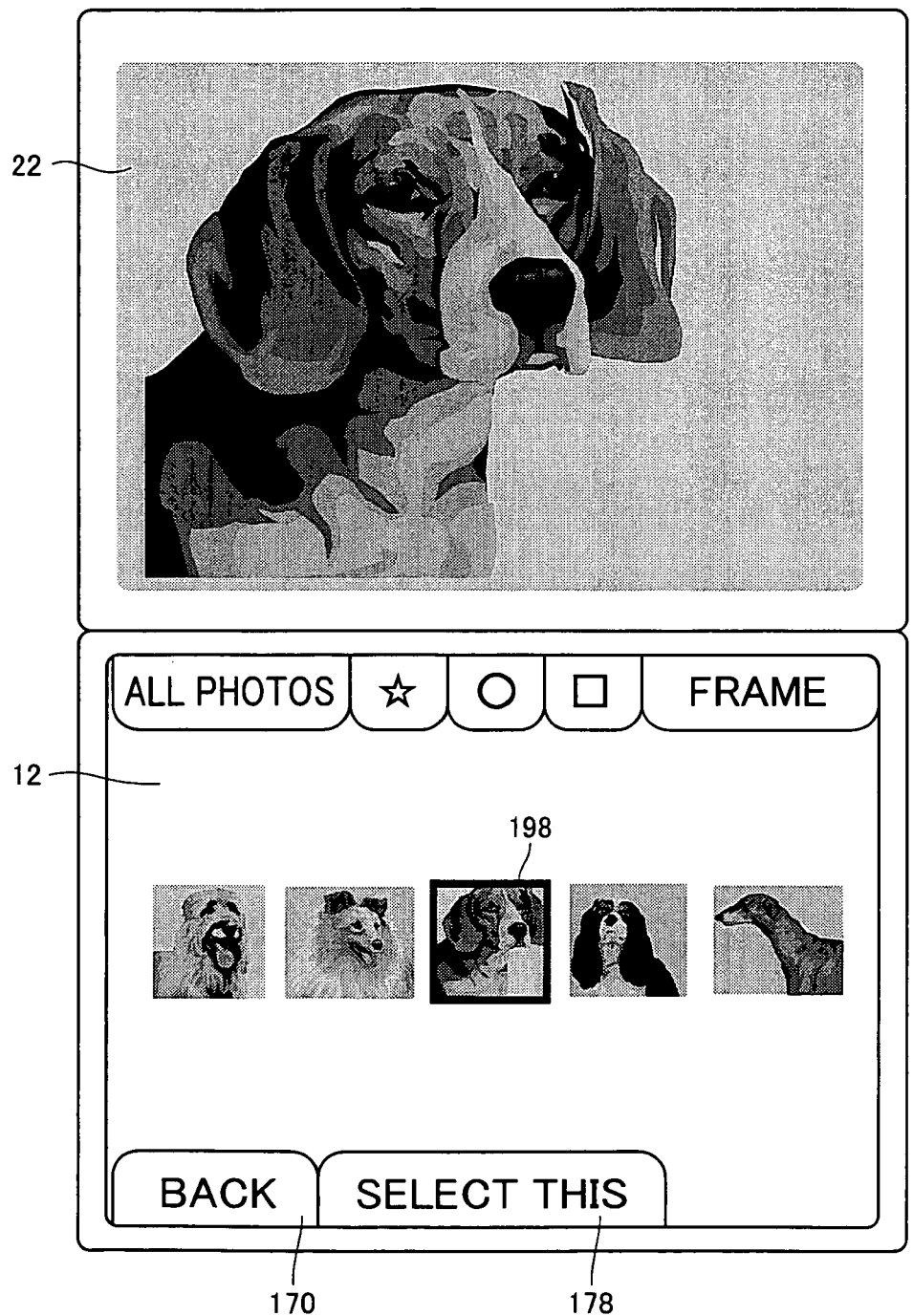
FIG. 22 is a diagram showing a screen display example (No. 5) in the game device according to the embodiment of the present invention.

In the screen shown in FIG. 22, generation of a frame image by using the image already stored in memory card 28 or the like is permitted. Lower LCD 12 displays a list of thumbnail images of the already stored images and a cursor 198 for designating these thumbnail images. In addition, upper LCD 22 displays the image designated with this cursor 198 in its entirety. Moreover, on lower LCD 12, "back" button 170 and "select this" button 178 are displayed in the lower portion of the screen. When button 170 is selected, selection of the already stored image is discarded and the screen returns to the screen shown in FIG. 20. On the other hand, when button 178 is selected, the image designated with cursor 198 is selected and transition to a screen shown in FIG. 23 which will be described later is made.

Figure 23:
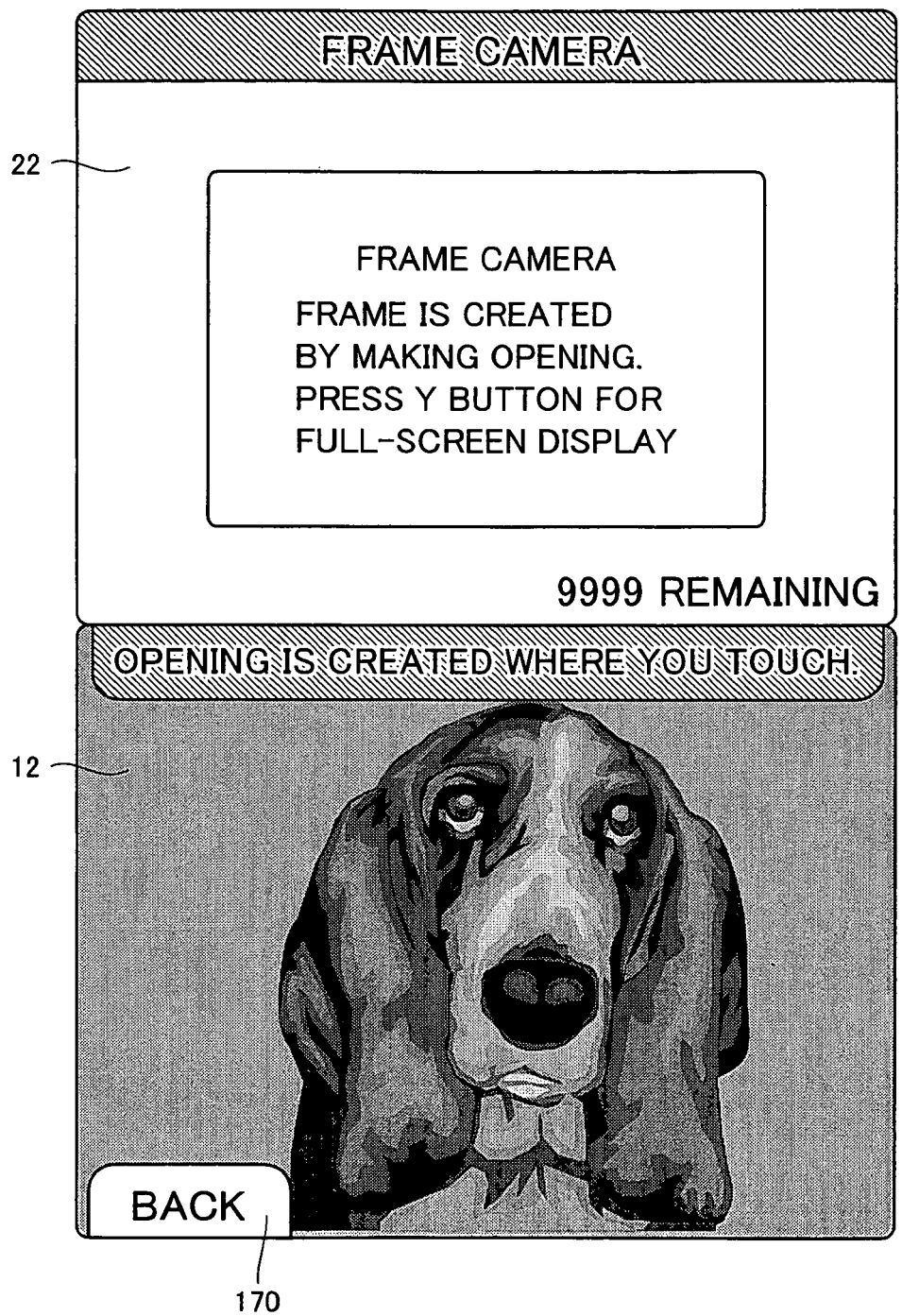
FIG. 23 is a diagram showing a screen display example (No. 6) in the game device according to the embodiment of the present invention.
Figure 24:
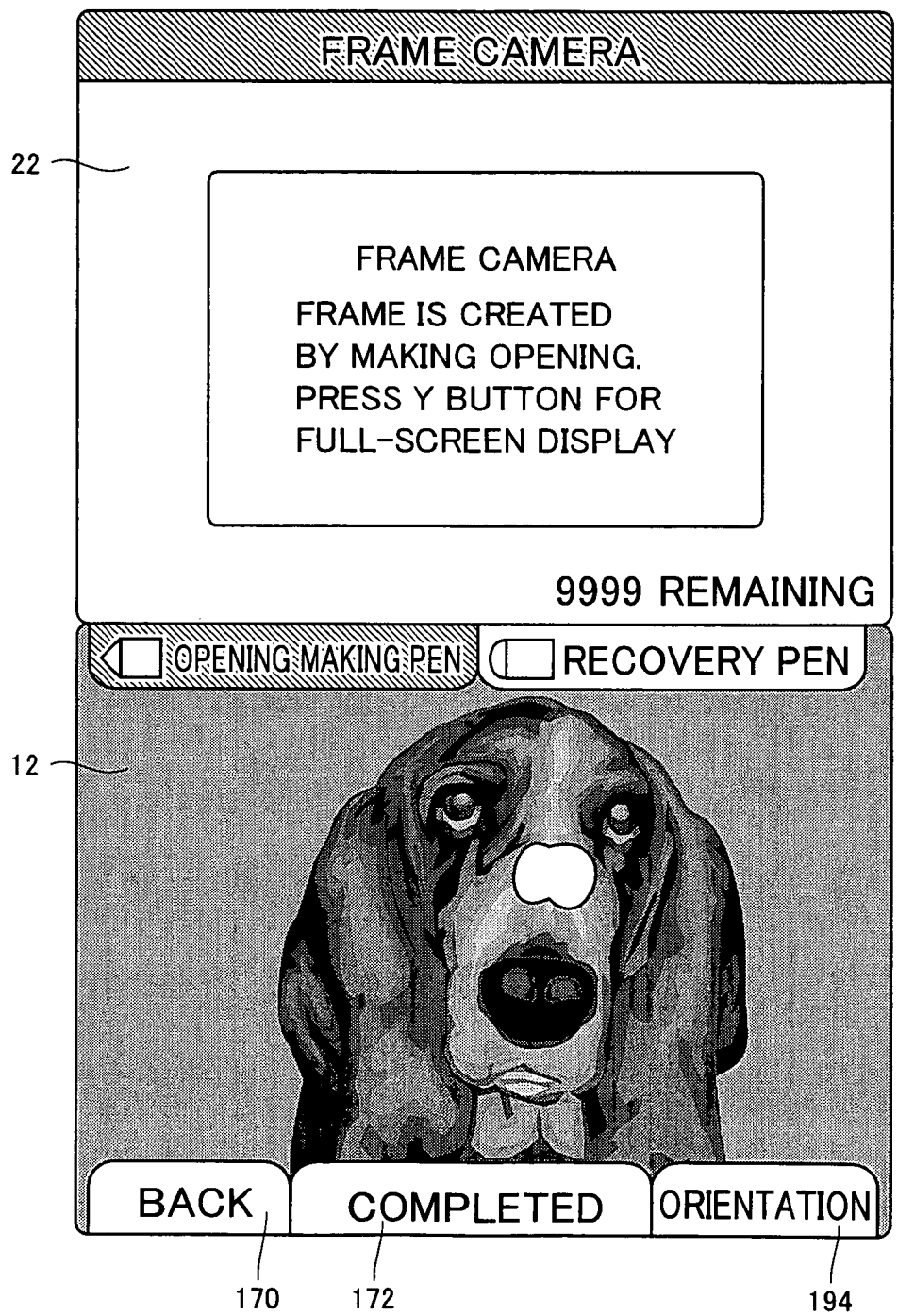
FIG. 24 is a diagram showing a screen display example (No. 7) in the game device according to the embodiment of the present invention.

In the screen shown in FIG. 23, generation of a frame image by scraping away the image is permitted. Lower LCD 12 displays the image serving as the generation source of the frame image and a state waiting for the touch operation with touch pen 27 etc. is set. In addition, lower LCD 12 displays a message that "opening is created where you touch" in the upper portion of the screen. When the touch operation is performed on a portion where the button on the image is not displayed in the screen shown in FIG. 23, transition to a screen shown in FIG. 24 is made. In addition, lower LCD 12 displays "back" button 170 in the lower left portion of the screen. When button 170 is selected, the screen returns to the screen shown in FIG. 21.

In addition, in the screen shown in FIG. 23, the image serving as the generation source of the frame image is displayed in full screen of upper LCD 22 and lower LCD 12, in response to the button operation (representatively, pressing of a Y button). Moreover, upper LCD 22 displays a message indicating that such an operation can be performed.

In the screen shown in FIG. 24, the edition operation for generating a frame image is permitted. More specifically, an operation to scrape away a part of the displayed image and also an operation to recover the scraped-away portion to the original state are permitted. In addition, lower LCD 12 displays "back" button 170, "completed" button 172 and an "orientation" button 194. When button 172 is selected, the frame image at that time point is stored in memory card 28 or the like and thereafter the screen returns to the screen shown in FIG. 21. In addition, when button 170 is selected, a message notifying the user that the frame image of which edition operation is in progress will not be stored is displayed. Then, when the user agrees with this notification, the screen returns to the screen shown in FIG. 21 or 22.

In addition, in the screen shown in FIG. 24, the frame image of which edition operation is in progress is displayed in full screen of upper LCD 22 and lower LCD 12, in response to the button operation (representatively, pressing of the Y button). In addition, upper LCD 22 displays a message indicating that such an operation can be performed. Moreover, similar processing is performed also when button 194 is selected.

<Processing Procedure>

A processing procedure relating to the "frame camera" function according to the present embodiment will be described hereinafter with reference to FIGS. 25 to 28. Each step shown in FIGS. 25 to 28 is implemented representatively by reading of a program or the like stored in memory card 29 to main memory 32 and execution thereof by CPU 31.

(Color Attribute Change Processing and Particle Generation Processing)

Figure 25:
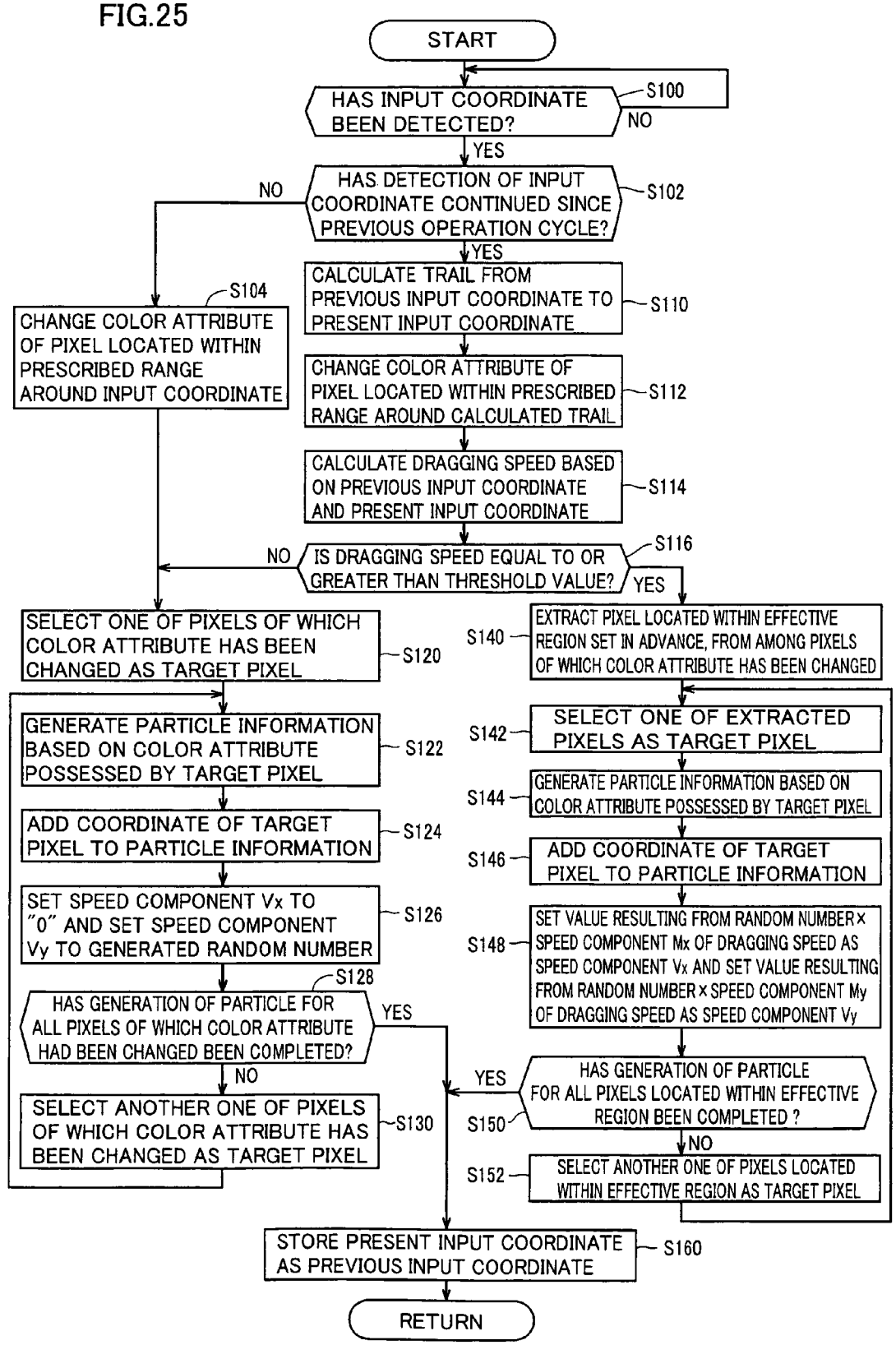
FIG. 25 is a flowchart showing color attribute change processing and particle generation processing according to the embodiment of the present invention.

FIG. 25 is a flowchart showing color attribute change processing and particle generation processing according to the embodiment of the present invention. The processing shown in FIG. 25 is periodically and repeatedly performed after the screen shown in FIG. 5 is displayed as a result of a prescribed operation in the menu screen. Prior to execution of the processing shown in FIG. 25, CPU 31 causes lower LCD 12 to display the image picked up by the camera (inner camera 23 and outer camera 25) or the image read from memory card 28 or the like.

Referring to FIG. 25, in step S100, CPU 31 determines whether or not the input coordinate has been detected by touch panel 13. Namely, CPU 31 determines whether the user has performed the touch operation with touch pen 27 etc. or not. When touch panel 13 has not detected the input coordinate (NO in step S100), the processing in step S100 is repeated. On the other hand, when touch panel 13 has detected the input coordinate (YES in step S100), the process proceeds to step S102.

In step S102, CPU 31 determines whether detection of the input coordinate by touch panel 13 has continued since the previous operation cycle or not. Namely, CPU 31 determines whether the user has continued the touch operation with touch pen 27 etc. or not.

When detection of the input coordinate by touch panel 13 has not continued since the previous operation cycle (NO in step S102), the process proceeds to step S104. On the other hand, when detection of the input coordinate by touch panel 13 has continued since the previous operation cycle (NO in step S102), the process proceeds to step S120.

In step S104, CPU 31 changes the color attribute of the pixel located within a prescribed range around the input coordinate. More specifically, CPU 31 sets the value (FIG. 13) of the "A flag" shown in FIG. 13 in connection with the corresponding pixel to "0" and sets the pixel as "ineffective". Then, the process proceeds to step S120. Though not shown in the flow, when the input coordinate is a coordinate on the image of button 170 or the like, processing in accordance with the corresponding button is performed.

On the other hand, in step S110, CPU 31 calculates the trail from the previous input coordinate to the present input coordinate. In successive step S112, CPU 31 changes the color attribute of the pixel located within a prescribed range around the calculated trail. Namely, CPU 31 sets the value (FIG. 13) of the "A flag" in connection with the pixel located within the prescribed range from the trail to "0".

In step S104 or S112, the prescribed range around the input coordinate may be changed depending on user setting selected in advance. For example, the configuration may be such that selection between a circle having a relatively small radius around the input coordinate and a circle having a relatively large radius can be made and a pixel of which color attribute is to be changed is specified in accordance with the selected radius.

In step S114, CPU 31 calculates the dragging speed based on a distance (Euclidian distance) between the previous input coordinate and the present input coordinate and a direction. In successive step S116, whether the calculated dragging speed is equal to or greater than a predetermined threshold value is determined. Namely, CPU 105 determines whether the user has quickly performed the touch operation with touch pen 27 etc. or not.

When the calculated dragging speed is smaller than the predetermined threshold value (NO in step S116), the process proceeds to step S120. On the other hand, when the calculated dragging speed is equal to or greater than the predetermined threshold value (YES in step S116), the process proceeds to step S140.

In step S120, CPU 31 selects one of the pixels of which color attribute has been changed as the target pixel. Then, in step S122, CPU 31 generates the particle information based on the color attribute (R value, G value, B value) possessed by the target pixel. In successive step S124, CPU 31 adds the coordinate of the target pixel to the particle information. In addition in step S126, CPU 31 sets speed component Vx in the direction of X-axis of the particle information to "0" and sets speed component Vy in the direction of Y-axis to a generated random number (random value). Then, in step S128, CPU 31 determines whether generation of particle for all pixels of which color attribute had been changed has been completed or not.

When generation of particle for all pixels of which color attribute had been changed has not been completed (NO in step S128), the process proceeds to step S130. In step S130, CPU 31 selects another one of the pixels of which color attribute has been changed as the target pixel. Then, the processing in step S122 and subsequent steps is repeated.

On the other hand, when generation of particle for all pixels of which color attribute had been changed has been completed (YES in step S128), the process proceeds to step S160.

In addition in step S140, CPU 31 extracts a pixel located within an effective region (FIG. 12) set in advance from among the pixels of which color attribute has been changed. In successive step S142, CPU 31 selects one of the extracted pixels as the target pixel. Then, in step S144, CPU 31 generates the particle information based on the color attribute (R value, G value, B value) possessed by the target pixel. In successive step S146, CPU 31 adds the coordinate of the target pixel to the particle information.

In addition in step S148, CPU 31 sets a value obtained by multiplying speed component Mx in the direction of X-axis of the dragging speed by the generated random number (random value) as speed component Vx in the direction of X-axis of the particle information, and sets a value obtained by multiplying speed component My in the direction of Y-axis of the dragging speed by the generated random number as speed component Vy in the direction of Y-axis of the particle information. By using a common random number (random value) in setting speed component Vx and speed component Vy, initial velocity of the particle can be set to a value corresponding to the direction in accordance with the drag direction immediately before.

Thereafter, in step S150, CPU 31 determines whether generation of particle for all pixels located within the effective region has been completed or not. When generation of particle for all pixels located within the effective region has not been completed (NO in step S150), the process proceeds to step S152. On the other hand, when generation of particle for all pixels located within the effective region has been completed (YES in step S150), the process proceeds to step S160.

In step S152, CPU 31 selects another one of pixels located within the effective region as the target pixel. Then, the processing in step S142 and subsequent steps is repeated.

In step S160, CPU 31 stores the present input coordinate as the previous input coordinate. Then, the process returns.

Step S116 described above essentially means the processing for distinguishing between a case where the dragging speed is greater than the predetermined threshold value and a case where the dragging speed is smaller than the predetermined threshold value. Therefore, when the dragging speed is the same as the predetermined threshold value, determination as any of these cases may be made. In the flowchart shown in FIG. 25, for the sake of convenience of processing, when the dragging speed is the same as the predetermined threshold value, the dragging speed is regarded as being greater than the predetermined threshold value.

(Particle Motion Processing)

Figure 26:
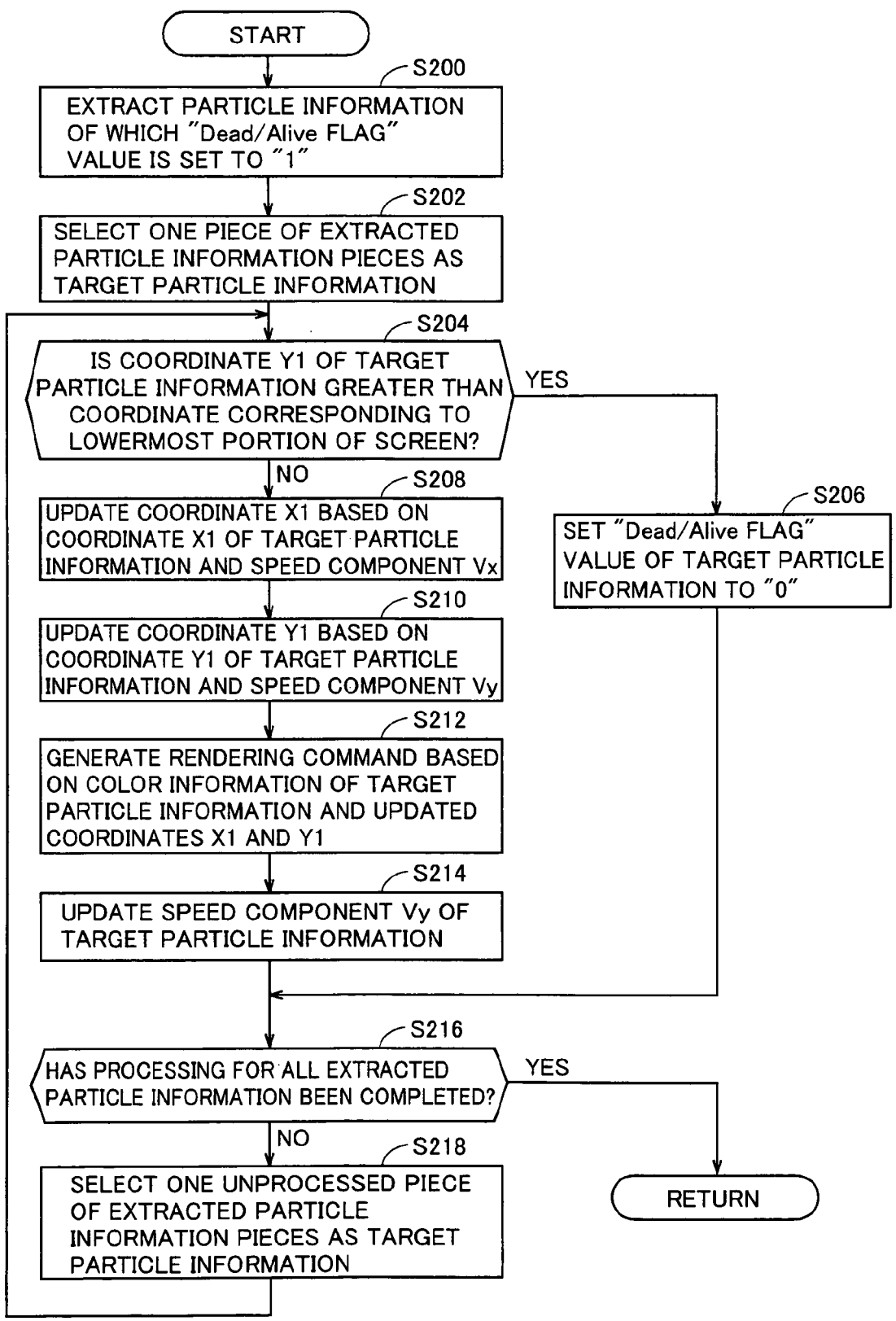
FIG. 26 is a flowchart showing particle motion processing according to the embodiment of the present invention.

FIG. 26 is a flowchart showing particle motion processing according to the embodiment of the present invention. The processing shown in FIG. 26 is periodically and repeatedly performed while the screen shown in FIG. 5 is displayed.

Referring to FIG. 26, in step S200, CPU 31 extracts particle information of which "Dead/Alive flag" value is set to "1", out of the already generated particle information. Namely, CPU 31 specifies a particle that should effectively be displayed. In successive step S202, CPU 31 selects one piece of the extracted particle information pieces as the target particle information. Then, the process proceeds to step S204.

In step S204, CPU31 determines whether coordinate Y1 in the direction of Y-axis described in the target particle information has a value greater than the coordinate corresponding to the lowermost portion of the screen or not. Namely, CPU 31 determines whether the display position of the particle is outside the screen or not.

In the present embodiment, only comparison between coordinate Y1 in the direction of Y-axis of the target particle and the coordinate corresponding to the lowermost portion of the screen is made, however, in another example, whether the display position of the particle is outside the screen or not may be determined by determining also whether coordinate Y1 in the direction of Y-axis has a value smaller than 0. Alternatively, whether the display position of the particle is outside the screen or not may be determined by determining also whether coordinate X1 in the direction of X-axis of the target particle has a value greater than the coordinate corresponding to the right end of the screen or a value smaller than 0.

When coordinate Y1 in the direction of Y-axis described in the target particle information has a value greater than the coordinate corresponding to the lowermost portion of the screen (YES in step S204), the process proceeds to step S206. On the other hand, when coordinate Y1 in the direction of Y-axis described in the target particle information does not have a value greater than the coordinate corresponding to the lowermost portion of the screen (NO in step S204), the process proceeds to step S208.

In step S206, CPU 31 sets the value of "Dead/Alive flag" of the target particle information to "0". Namely, CPU 31 erases the particle based on the target particle information from the screen. Then, the process proceeds to step S216. Instead of the configuration to set the value of the "Dead/Alive flag" of the particle information to "0", the particle information itself may be deleted.

In step S208, CPU 31 updates the value of coordinate X1 in the direction of X-axis based on coordinate X1 in the direction of X-axis described in the target particle information and speed component Vx in the direction of X-axis. The target particle information is overwritten with this updated coordinate X1. In successive step S210, CPU 31 updates the value of coordinate Y1 in the direction of Y-axis based on coordinate Y1 in the direction of Y-axis described in the target particle information and speed component Vy in the direction of Y-axis. The target particle information is overwritten with this updated coordinate Y1. Then, the process proceeds to step S212.

In step S212, CPU 31 generates the rendering command based on the color information (R value, G value, B value) described in the target particle information and updated coordinates X1 and Y1. The rendering processing which will be described later is performed in response to this rendering command. In addition, in successive step S214, CPU 31 updates speed component Vy in the direction of Y-axis described in the target particle information. The target particle information is overwritten with this updated speed component Vy. Thereafter, the process proceeds to step S216.

In step S216, CPU 31 determines whether processing for all particle information extracted in step S200 has been completed or not.

When processing for all extracted particle information has not been completed (NO in step S216), the process proceeds to step S218. In step S218, CPU 31 selects one unprocessed piece of the extracted particle information pieces as the target particle information. Then, the processing in step S204 and subsequent steps is repeated.

On the other hand, when processing for all extracted particle information has been completed (YES in step S216), the process returns.

(Rendering Processing)

Figure 27:
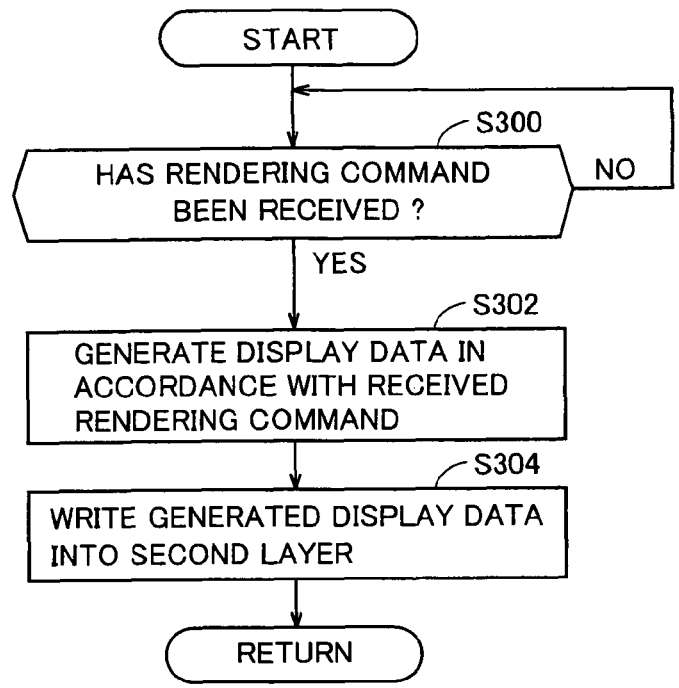
FIG. 27 is a flowchart showing rendering processing according to the embodiment of the present invention.

FIG. 27 is a flowchart showing rendering processing according to the embodiment of the present invention. The processing shown in FIG. 27 is performed each time an event of the rendering command is generated.

Referring to FIG. 27, in step S300, CPU 31 determines whether the rendering command has been received or not. When the rendering command has not been received, the processing in step S300 is repeated. When the rendering command is received (YES in step S300), the process proceeds to step S302.

In step S302, CPU 31 generates display data in accordance with the received rendering command. In successive step S304, CPU 301 writes the generated display data into second layer 244 (FIG. 17). Then, the process ends and a state of waiting for a next rendering command is set.

As described above, according to the embodiment of the present invention, the user can be provided with feeling closer to actual experience in connection with the operation to scrape away the image.

(Sound Effect Processing)

Figure 28:
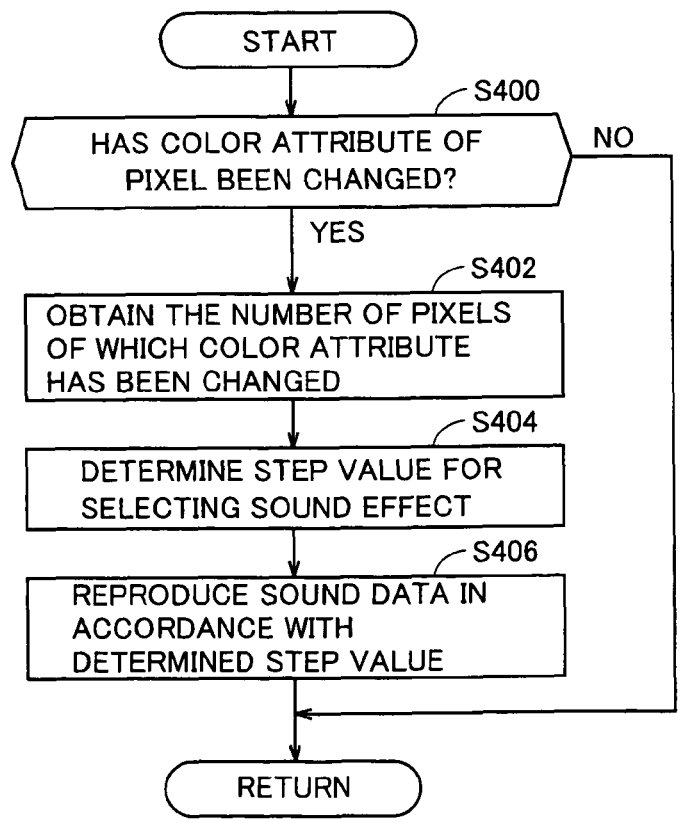
FIG. 28 is a flowchart showing sound effect generation processing according to the embodiment of the present invention.

FIG. 28 is a flowchart showing sound effect generation processing according to the embodiment of the present invention. The processing shown in FIG. 28 is periodically and repeatedly performed while the screen shown in FIG. 5 is displayed.

Referring to FIG. 28, in step S400, CPU 31 determines whether the color attribute of the pixel has been changed or not. Namely, CPU 31 determines whether or not the color attribute of any pixel has been changed in accordance with the trail of the input coordinate in step S112 shown in FIG. 25.

Whether the color attribute of the pixel has been changed or not is determined.

When the color attribute of the pixel has been changed (YES in step S400), the process proceeds to step S402. On the other hand, when the color attribute of the pixel has not been changed (NO in step S400), the process returns.

In step S402, CPU 31 obtains the number of pixels of which color attribute has been changed. In successive step S404, CPU 31 determines the step value for selecting sound effect to be output, based on the obtained number of pixels. In further successive step S406, CPU 31 reproduces sound data in accordance with the determined step value. Thereafter, the process returns.

<Variation>

In the embodiment described above, the configuration in which processing for attaining an effect is switched between two steps depending on the dragging speed has been illustrated, however, the processing may be switched among a further greater number of steps or may continuously be switched. For example, the number of particles generated per a unit area of the change target region may be set to the number in inverse proportion to the dragging speed.

In the embodiment described above, the configuration in which the "scraping away" effect is achieved by erasing display at the touched position has been illustrated as a typical example of color attribute change, however, other parameters of the color attribute may be changed. For example, each piece of color information of RGB may be changed. CMY which is a complementary color for RGB or HSV (hue, color saturation, lightness) may be adopted as the coordinate system defining the color information. Then, at least one of such color information may be changed.

In the embodiment described above, the configuration in which one particle is generated for one pixel has been illustrated as basic processing, however, other generation processing may be adopted. For example, one particle may be generated for a plurality of pixels, or on the contrary, a plurality of particles may be generated for one pixel. In a case where one particle is generated for a plurality of pixels, color information of representative one pixel among a plurality of corresponding pixels may be used as the color information of the generated particle, or the color information of the generated particle may be set based on the color information of each pixel included in the plurality of pixels (typically, based on average of the color information).

In the embodiment described above, a method of generating a particle only for a pixel included in a region set in advance has been illustrated as exemplary processing for thinning out generated particles, however, another method may be employed. For example, a particle may be generated only for some pixels that have randomly been extracted from among the pixels included in the change target region of which color attribute is to be changed.

In the embodiment described above, processing for displaying a moving state of a particle (object) after the particle is generated in accordance with the change target region has been illustrated. The processing, however, may be performed such that a plurality of (invisible) objects are generated in advance for a displayed image, and when the touch operation is performed, the object corresponding to the touch operation starts movement.

In the embodiment described above, the configuration in which the dragging speed is resolved into each component in a coordinate system of X-Y axes orthogonal to each other has been illustrated, however, another coordinate system may be employed. For example, a cylindrical coordinate system may be used to resolve the dragging speed into a radial component and a circumferential component for processing.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium storing an image processing program executed by a computer representing an information processing device interacting with a display device and an input device detecting an input coordinate, said image processing program causing said computer to perform functionality comprising:
    displaying a target image on said display device;
    changing a color attribute of a change target region in said target image, which is a region corresponding to the input coordinate from said input device; and
    displaying a moving state of an object independently of a subsequent input coordinate, the object having a color attribute in accordance with a color attribute before change of said change target region and a speed of movement for the object successively updated.

2. The non-transitory storage medium storing an image processing program according to claim 1, wherein said image processing program causes said computer to further perform functionality comprising displaying a moving state of said object with a position of said change target region serving as a movement start position.

3. The non-transitory storage medium storing an image processing program according to claim 2, wherein said image processing program causes said computer to further perform functionality comprising displaying a moving state of said object in number in accordance with an area of said change target region.

4. The non-transitory storage medium storing an image processing program according to claim 3, wherein said image processing program causes said computer to further perform functionality comprising newly displaying a moving state of said object in number in accordance with an area of a region of which change of a color attribute has newly been indicated.

5. The non-transitory storage medium storing an image processing program according to claim 4, wherein said image processing program causes said computer to further perform functionality comprising:
setting, as a substantial change target region, a region except for a region in said change target region of which color attribute has already been changed,
changing a color attribute only of said substantial change target region, and
displaying a moving state of said object in number in accordance with an area of said substantial change target region of which color attribute has been changed.

6. The non-transitory storage medium storing an image processing program according to claim 3, wherein said image processing program causes said computer to further perform functionality comprising lowering, when an area of a region of which change of a color attribute has newly been indicated is great, a ratio of the number of said objects of which moving state is to be newly displayed to the area of that region.

7. The non-transitory storage medium storing an image processing program according to claim 1, wherein said image processing program causes said computer to further perform functional comprising generating said object when the color attribute of said change target region is changed, and varying over time a display position of the generated object.

8. The non-transitory storage medium storing an image processing program according to claim 1, wherein said image processing program causes said computer to further perform functionality comprising erasing the object after the moving state of said object is displayed.

9. The non-transitory storage medium storing an image processing program according to claim 1, wherein said input device repeatedly obtains the input coordinate, a quantity of variation of said input coordinate is obtained, and movement of said object is started at a speed in accordance with said quantity of variation.

10. The non-transitory storage medium storing an image processing program according to claim 1, wherein said input device repeatedly obtains the input coordinate, a direction of movement of said input coordinate is obtained, and movement of said object is started in a direction in accordance with said direction of movement.

11. The non-transitory storage medium storing an image processing program according to claim 1, wherein said image processing program causes said computer to further perform functionality comprising:
obtaining a quantity of variation of said input coordinate,
selecting any of first and second modes based on said quantity of variation,
setting an initial value of a first speed component along a first direction and an initial value of a second speed component along a second direction different from said first direction,
selecting the first mode when said quantity of variation is smaller than a prescribed threshold value,
selecting the second mode when said quantity of variation is greater than said prescribed threshold value,
setting the initial value of said first speed component to zero and randomly setting the initial value of said second speed component when said first mode is selected,
setting the initial value of said first speed component based on a component of the moving speed along said first direction and a random value, and
setting the initial value of said second speed component based on a component of the moving speed along said second direction and a random value when said second mode is selected.

12. The non-transitory storage medium storing an image processing program according to claim 1, wherein said image processing program causes said computer to further perform functionality comprising displaying, regarding a plurality of partial regions within said change target region, a moving state of objects each having a color attribute in accordance with a color attribute before change of the corresponding partial region.

13. The non-transitory storage medium storing an image processing program according to claim 12, wherein said image processing program causes said computer to further perform functionality comprising starting movement of each object after randomly setting at least one of a speed and a direction for each said object.

14. The non-transitory storage medium storing an image processing program according to claim 1, wherein said target image includes a plurality of pixels each having the color attribute, a moving state of a plurality of objects corresponding to a plurality of pixels included in said change target region respectively is displayed, a color attribute of each object being in accordance with a color attribute of each pixel before change, and the color attribute of the change target region in said target image is changed to a transparent color attribute.

15. The non-transitory storage medium storing an image processing program according to claim 1, wherein said image processing program causes said computer to further perform functionality comprising displaying, regarding only a target region in said change target region set in advance with respect to said target image, a moving state of an object having a color attribute in accordance with a color attribute of that target region before change.

16. The non-transitory storage medium storing an image processing program according to claim 15, wherein said target image includes a plurality of pixels each having the color attribute, and said target region is set as a grid-like region including a pixel having a prescribed coordinate value.

17. The non-transitory storage medium storing an image processing program according to claim 1, wherein said image processing program causes said computer to further perform functionality comprising generating sound together with change of the color attribute, displaying a moving state of an object having a color attribute in accordance with a color attribute of each pixel included in said change target region, for each pixel, and changing sound to be generated, in accordance with number of pixels of which color attribute has been changed.

18. The non-transitory storage medium storing an image processing program according to claim 17, wherein the changing of sound includes increasing number of generated sounds as the number of pixels of which color attribute has been changed is greater.

19. The non-transitory storage medium storing an image processing program according to claim 17, wherein the changing of sound includes generating, when the color attribute of a single pixel has been changed, sound different from sound generated when the color attribute of a plurality of pixels has been changed.

20. The non-transitory storage medium storing an image processing program according to claim 1, wherein one or more particles are generated corresponding to said change target region when the color attribute of the change target region in said target image is changed, and the one or more particles move to correspond to the displayed moving state.

21. The non-transitory storage medium storing an image processing program according to claim 20, wherein a speed of movement for each particle in the one or more particles is set to an initial value and successively updated to correspond to movement of the input device.

22. An information processing device comprising at least processing circuitry and interacting with a display device and an input device detecting an input coordinate, the information processing device configured to:
   display a target image on said display device;
   change a color attribute of a change target region in said target image, which is a region corresponding to the input coordinate from said input device; and
   display a moving state of an object independently of a subsequent input coordinate, the object having a color attribute in accordance with a color attribute before change of said change target region and a speed of movement for the object being successively updated.

23. The information processing device of claim 22, wherein one or more particles are generated corresponding to said change target region when the color attribute of the change target region in said target image is changed, and the one or more particles move to correspond to the displayed moving state.

24. The information processing device of claim 23, wherein a speed of movement for each particle in the one or more particles is set to an initial value and successively updated to correspond to movement of the input device.

25. A method executed by a computer representing an information processing device having at least one processor and interacting with a display device and an input device detecting an input coordinate, the method comprising:
   displaying a target image on said display device;
   changing a color attribute of a change target region in said target image, which is a region corresponding to the input coordinate from said input device; and
   displaying a moving state of an object independently of a subsequent input coordinate, the object having a color attribute in accordance with a color attribute before change of said change target region and a speed of movement for the object being successively updated.

26. The method of claim 25, wherein one or more particles are generated corresponding to said change target region when the color attribute of the change target region in said target image is changed, and the one or more particles move to correspond to the displayed moving state.

27. The method of claim 26, wherein a speed of movement for each particle in the one or more particles is set to an initial value and successively updated to correspond to movement of the input device.

28. An information processing system, comprising:
   a display configured to display image data;
   an input device configured to detect an input coordinate; and a processing system having at least processing circuitry, the processing system configured to:
   display a target image on said display device,
   change a color attribute of a change target region in said target image, which is a region corresponding to the input coordinate from said input device, and
   display a moving state of an object independently of a subsequent input coordinate, the object having a color attribute in accordance with a color attribute before change of said change target region and a speed of movement for the object being successively updated.

29. The information processing system of claim 28, wherein one or more particles are generated corresponding to said change target region when the color attribute of the change target region in said target image is changed, and the one or more particles move to correspond to the displayed moving state.

30. The information processing system of claim 29, wherein a speed of movement for each particle in the one or more particles is set to an initial value and successively updated to correspond to movement of the input device.

* * * * *